(12) United States Patent
Park et al.

(10) Patent No.: US 6,822,935 B1
(45) Date of Patent: Nov. 23, 2004

(54) TRACK DISCRIMINATING APPARATUS AND METHOD FOR OPTICAL RECORDING MEDIUM

(75) Inventors: Sang On Park, Kyonggi-do (KR); You Jae Park, Seoul (KR); Kyung Soo Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 600 days.

(21) Appl. No.: 09/662,881

(22) Filed: Sep. 15, 2000

(30) Foreign Application Priority Data

Sep. 16, 1999 (KR) .......................................... 1999/39891
Dec. 30, 1999 (KR) .......................................... 1999/67414
Jan. 26, 2000 (KR) .......................................... 2000/3584

(51) Int. Cl.$^7$ .............................................. G11B 7/00
(52) U.S. Cl. .................. 369/53.22; 369/44.26
(58) Field of Search .......................... 369/44.25, 44.26, 369/44.28, 44.29, 44.35, 275.3, 275.4, 53.2, 53.22, 53.23, 44.41, 47.23, 47.24, 47.27, 47.37, 47.3, 47.22, 53.37, 44.27

(56) References Cited

U.S. PATENT DOCUMENTS

| | | | | |
|---|---|---|---|---|
| 5,335,214 A | * | 8/1994 | Matoba et al. ........... | 369/44.28 |
| 6,091,699 A | * | 7/2000 | Nakane et al. ........... | 369/275.3 |
| 6,192,015 B1 | * | 2/2001 | Kim ......................... | 369/47.48 |
| 6,240,055 B1 | * | 5/2001 | Takamine et al. ........ | 369/53.22 |
| 6,252,845 B1 | * | 6/2001 | Hino et al. ............... | 369/275.3 |
| 6,282,160 B1 | * | 8/2001 | Tateishi et al. .......... | 369/44.41 |
| 6,307,821 B1 | * | 10/2001 | Oohata et al. ........... | 369/47.15 |
| 6,310,851 B1 | * | 10/2001 | Tobita et al. ............ | 369/275.4 |
| 6,314,066 B1 | * | 11/2001 | Hong et al. .............. | 369/44.28 |
| 6,335,070 B1 | * | 1/2002 | Tomita ..................... | 369/275.4 |
| 6,377,522 B1 | * | 4/2002 | Toda ........................ | 369/44.26 |
| 6,381,201 B1 | * | 4/2002 | Shihara et al. ........... | 369/32.01 |

* cited by examiner

Primary Examiner—Thang V. Tran

(57) ABSTRACT

A land/groove track discriminating method and apparatus for an optical recording medium having a land/groove structure which can stably discriminate the kind of a track even in an unstable state of the system. The kind of the track is discriminated by using the differential characteristic of a tracking error signal in a header region, by using the relation that the phase of a wobbling signal in the lang track is opposite to the phase of the wobbling signal in the groove track, or by comparing phase levels of delayed first and second header region signals. Accordingly, the servo control suitable to the kind of the track can be performed at a proper time, and thus an accurate tracking control can be performed with respect to an optical disc having the land/groove track structure.

20 Claims, 18 Drawing Sheets

(a)

(b)

TRACK DISCRIMINATING APPARATUS AND METHOD FOR OPTICAL RECORDING MEDIUM

BACKGROUND OF THE INVENTION

1. Field of the Invention

The present invention relates generally to a rewritable optical recording medium system, and more particularly to an apparatus and method for discriminating between a land track and a groove track in a land/groove recording system having the structure where a signal track is composed of the land and the groove.

2. Background of the Related Art

With the growth of audio and video media, optical recording/reproducing apparatus for recording and reproducing audio/video data on a semipermanent optical recording medium have been developed.

In case of the optical recording medium, as the storage capacity of the existing CD-ROM title reaches the uppermost limit, a digital versatile disc (DVD) is in the spotlight as a new optical recording medium. The DVD recognizes data in the same manner as a compact disc (CD) which recognizes data of "0" and "1" according to reflecting angles of a laser. However, the storage width of data in the DVD is minute in comparison to that in the CD.

Like the CD, the DVD is been developed from the technique of reproducing the data recorded on the disc to the technique of freely and repeatedly recording the data on the disc. In order to achieve this, various kinds of rewritable DVDs have been proposed lately. One among them, there exists a DVD where a disc track is divided into a land and groove (hereinafter referred to as 'land/groove' or 'L/G') tracks, and the data is recorded in the respective tracks (for instance, DVD-RAM).

FIG. 1 is a block diagram illustrating the construction of a typical apparatus for recording and reproducing data on the optical recording medium. Referring to FIG. 1, under the control of a servo control section 106, an optical pickup 102 places an optical beam condensed through an object lens on a signal track of an optical recording medium, i.e., an optical disc 101, and makes the optical beam reflected from a signal recording surface of the track condensed through the object lens and incident to an optical detector to detect a focus error signal and a tracking error signal. The optical detector is composed of several optical detecting elements, which output to a radio frequency (RF) and servo error generating section 104 electric signals in proportion to quantities of light obtained by the respective optical detecting elements.

For example, if the optical detector is composed of four optical detecting elements PDA, PDB, PDC, and PDD divided by four in a signal track direction and in a radial direction, the optical detector outputs to the RF and servo error generating section 104 electric signals a, b, c, and d in proportion to quantities of light obtained by the respective optical detecting elements PDA, PDB, PDC, and PDD.

The RF and servo error generating section 104 generates an RF signal required for data reproduction, read channel 2 signal required for servo control, focus error signal, etc., by combining the electric signals a, b, c, and d.

Here, the RF signal (also called 'read channel 1 signal') may be obtained by computing (a+b+c+d) of the electric signals outputted from the optical detector, and the read channel 2 signal by computing (a+d)−(b+c). The tracking error (TE) signal may be obtained by processing the read channel 2 signal.

Meanwhile, if the optical detector is divided by two in a track direction, i.e., into two photodiodes I1 and I2, the RF signal (=I1+I2) and read channel 2 signal (=I1−I2) are detected from the balance of the light quantities of the photodiodes. In other words, a+d and b+c in FIG. 2 correspond to I1 and I2, respectively.

At this time, the RF signal is outputted to a data decoder 105 for data reproduction, the servo error signal such as FE and TE to a servo control section 106, and the control signal for data recording to an encoder 103.

The encoder 103 encodes the data to be recorded to recording pulses of a format required by the optical disc 101, and records the pulses on the optical disc 101 through the optical pickup 102. The decoder 105 restores the data of the original form from the RF signal.

Meanwhile, a host such as a personal computer (PC) may be connected to the optical disc recording/reproducing apparatus. This host transmits a recording/reproducing command to a microcomputer 111 through an interface 110, transmits the data to be recorded to the encoder 103, and receives reproduced data from the decoder 105. The microcomputer 111 controls the encoder 103, decoder 105, and servo control section 106 in accordance with the recording/reproducing command from the host.

At this time, an advanced technology attached packet interface (ATAPI) is typically used as the interface 110. Specifically, the ATAPI is the interface standard between the host and the optical recording/reproducing apparatus such as a CD or DVD driver proposed to transmit the data decoded by the optical recording/reproducing apparatus to the host, and serves to convert the decoded data into a protocol of a data packet that can be processed in the host and transmit the data packet.

Meanwhile, the servo control section 106 processes the focus error signal (FE), and outputs a driving signal for focusing control to a focus servo driving section 107. The servo control section 106 also processes the tracking error signal (TE), and output a driving signal for tracking control to a tracking servo driving section 108.

The focus servo driving section 107 moves the optical pickup 102 up and down by driving a focus actuator in the optical pickup 102, so that the optical pickup 107 follows the movement of the rotating optical disc 101.

The tracking servo driving section 108 moves the object lens of the optical pickup 102 in a radial direction by driving a tracking actuator in the optical pickup 102, so that the object lens corrects the position of the optical beam, and follows the track.

If the DVD is a rewritable disc, for example, DVD-RAM, where the signal track is composed of the land and groove, the data can be recorded on or reproduced from both the land track and the groove track as well as either of the land track and the groove track. Here, the land track and the groove track have different depths in a light incident direction. For instance, the DVD-RAM has a depth difference of $\lambda/6$ between the land track and the groove track.

FIG. 3 illustrates an example of a disc having the above-described L/G track structure. Referring to FIG. 3, the track protruded in the incident direction of the optical beam from the optical pickup 102 is defined as a groove track 2, and the track arranged to alternate with the groove track and depressed from the incident optical beam is defined as a land track 3. Accordingly, there is a predetermined height difference d between the groove track 2 and the land track 3. The track pitch (TP) is different according to the kind of disc, but is commonly 1 $\mu$m or less.

As shown in FIG. 4, each track is composed of a plurality of sectors which are a data region, and a header region which includes sector position information and control information and which is positioned between the respective sectors. The header region is pre-formatted, and thus the tracking control can be effected in a blank disc where no information signal is recorded.

The header region is a region where data cannot be recorded, is used for obtaining various kinds of information for performing the recording and reproduction, and is generally predetermined by a disc manufacturer.

The header region is briefly classified into two kinds. As shown in FIG. 4, one is a header region 8 positioned between sectors in the same track (hereinafter referred to as 'header region within a track'), and the other is a header region 9 positioned between the last sector 4 of the land track and the first sector 5 of the groove track (hereinafter referred to as 'header region between tracks'). Accordingly, the optical disc recording/reproducing apparatus as shown in FIG. 1 can discriminate the track kind at the present position from the header region within a track, and recognize the track changeover from the header region between tracks, so that the servo suitable for the changed track can be performed.

FIG. 5 illustrates in detail 'A' and 'B' portions in FIG. 4. Referring to FIG. 5, the header region has a first header field 91 phase-converted centering around a track center, and a second header field 92. If the disc is the DVD-RAM, the first and second header fields include two header fields, respectively.

In the header region where the land track switches over to the groove track, the first header field is first detected at a position higher than the track center, and then the second header field is detected at a position lower than the track center. On the contrary, in the header region where the groove track switches over to the land track, the first header field is first detected at a position lower than the track center, and then the second header field is detected at a position higher than the track center.

Meanwhile, the control information recorded in the header region may be recorded in a wobbling form along the track. Here, the wobbling means that the control information is recorded on a boundary surface of the track by the change of a laser beam of a laser diode by supplying to the power of the laser diode information to be applied to the disc by modulating a predetermined clock signal, for example, information on the corresponding position, information on the rotating speed of the disc, etc.

Referring to FIG. 6, it can be recognized that the track boundary surface of the sector which is the data region arranged between the header regions has the wobbling form. Specifically, (a) in FIG. 6 shows an example of a wobbling signal in the groove track, and (b) shows an example of a wobbling signal in the land track. Here, no wobbling signal is recorded in the header region.

In order to perform the recording/reproduction on the optical disc having the structure where the signal track is composed of the land and the groove, the optical beam should accurately follow the center of the land and groove tracks. At this time, the optical beam should be controlled in a different manner according to the land and groove tracks, and thus it is important to accurately discriminate the kind of the track.

As shown in FIG. 3, since the respective tracks have the height difference and the track pitch is very dense, there exists a difference in DC offset (produced in signal due to the L/G depth difference) when the focusing or tracking servo is performed. Also, the tracking error signal in the land has an opposite phase to the tracking error signal in the groove. However, in order to normally follow both the land and groove tracks, the tracking error signals obtained from the land and the groove have the same phase.

Accordingly, the kind of the track to be recorded/reproduced should be discriminated in advance, and the servo should be performed accordingly. Specifically, in the land track, the tracking servo should be performed by the tracking error signal offset-adjusted and inverted to match the land, while in the groove track, the tracking servo should be performed by the tracking error signal offset-adjusted and inverted to match the groove. In order to achieve this, it should be rapidly and accurately discriminated whether the track where the optical beam is currently positioned is the land or the groove.

A conventional method of discriminating whether the track is the land or the groove uses the header region as shown in FIG. 7. The phase of the tracking error signal in the header region in case of following the land track is opposite to the phase of the tracking error signal in case of following the groove track.

Referring to FIG. 7, the read channel 2 signal generated from the RF and servo error generating section 104 or the tracking error signal obtained by processing the read channel 2 signal is inputted to first and second comparators 201 and 202. At this time, since the first header field and the second header field in the header region are alternately arranged on the basis of the track center, the read channel 2 signals detected from the first header field and the second header field have the phases (i.e., tilts) opposite to each other.

For the convenience in explanation, it is assumed that the header signal detected at a position higher than the track center is a first header region signal IP1, and the header signal detected at a position lower than the track center is a second header region signal IP2.

If the read channel 2 signal inputted to a plus terminal of the first comparator 201 is higher than a slice level signal inputted to a minus terminal thereof, the first comparator 201 outputs to an L/G discriminating section 203 the first header region signal IP1 as shown as (a) in FIGS. 8 and 9. If the read channel 2 signal inputted to a minus terminal of the second comparator 202 is lower than the slice level signal inputted to a plus terminal thereof, the second comparator 202 outputs to the L/G discriminating section 203 the second header region signal IP2 as shown as (b) in FIGS. 8 and 9.

At this time, the phases of the IP1 signal and the IP2 signal are changed according to the fact that the currently following track is the land or the groove as shown in FIGS. 8 and 9. The header region where the land track switches over to the groove track is detected as shown in FIG. 8, and the header region where the groove track switches over to the land track is detected as shown in FIG. 9.

Accordingly, the L/G discriminating section 203 discriminates the track by the detection order of the IP1 and IP2 signals, and outputs a track switchover signal L/G SW as shown as □ in FIGS. 8 and 9 to the servo control section 106, so that the servo control section 106 performs the servo control suitable to the changed track.

However, though the conventional track discriminating method as described above can be used without any problem in case that the IP1 and IP2 signals are accurately detected in the header region by the stable performance of the servo, there is a possibility that a signal having a similar waveform to the above signals is detected anywhere of the disc, and such a possibility becomes greater in case that the system is unstable.

Here, the time point where the servo is unstable may be the case that the system is initially operated, or a track jump or track cross is performed. In this case, the IP1 and IP2 signals are detected unstably, and it is unreliable that the IP1 and IP2 signals are the signals detected from the header region as well. If the IP1 and IP2 signals are not accurately detected as above, the land/groove track discrimination also becomes inaccurate. Accordingly, the tracking and focusing servo cannot be performed properly, and this causes much time to be required for reaching the normal recording/reproduction, and the recording/reproduction itself to be impossible in the worst case.

SUMMARY OF THE INVENTION

Accordingly, the present invention is directed to a track discriminating method and apparatus for an optical recording medium that substantially obviate one or more of the problems due to limitations and disadvantages of the related art.

An object of the present invention is to provide a track discriminating method and apparatus for an optical recording medium which can stably discriminate the kind of a track even in an unstable servo state.

It is another object of the present invention to provide a track discriminating method and apparatus for an optical recording medium which can stably discriminate the kind of a track using the differential characteristic of an optical reflection signal of the optical recording medium.

It is still another object of the present invention to provide a track discriminating method and apparatus for an optical recording medium which can stably discriminate the kind of a track from a wobbling signal in a land/groove recording system having a wobbling structure.

It is still another object of the present invention to provide a track discriminating method and apparatus for an optical recording medium which can stably discriminate the kind of a track by delaying at least either of first and second header region signals for a predetermined time and comparing the phases of the two signals.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the track discriminating method for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, comprises the steps of obtaining a difference signal of optical reflection signals in a track direction of the optical recording medium, differentiating the difference signal, and slicing the differentiated difference signal by predetermined upper and lower slice levels and discriminating a kind of the track from a sliced signal.

The track discriminating step may comprise the step of performing a servo by a servo error signal offset-adjusted to match the land track if the discriminated track is the land track, while performing a servo by a servo error signal offset-adjusted to match the groove track if the discriminated track is the groove track.

In another aspect of the present invention, there is provided a track discriminating apparatus for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, comprising a servo error generating section for obtaining a difference signal of optical reflection signals in a track direction of the optical recording medium, a differentiation section for differentiating the difference signal, a slicing section for slicing the differentiated difference signal by predetermined upper and lower reference slice levels, and a signal generating section for discriminating a kind of the track using a result of slicing and generating a land/groove (L/G) discrimination signal according to a result of discrimination.

In still another aspect of the present invention, there is provided a track discriminating method for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the method comprising the steps of detecting a phase of a wobbling signal formed on respective land/groove (L/G) tracks of the optical recording medium, and discriminating a kind of the present track by checking whether the phase of the wobbling signal is inverted using a reference signal and outputting an L/G discrimination signal according to a result of discrimination.

The phase detecting step detects the phase of the wobbling signal by slicing the wobbling signal formed on the respective L/G tracks by a center level.

The discriminating step comprises the steps of exclusive-OR-gating the wobbling signal sliced by the center level and the fedback L/G discrimination signal, generating a reference signal by applying a phase locked loop (PLL) to an exclusive-OR-gated signal, and discriminating a kind of the present track by checking whether the phase of the sliced wobbling signal is equal or opposite to the phase of the reference signal and discriminating whether the present track is the land track or the groove track according to a result of discrimination.

In still another aspect of the present invention, there is provided a track discriminating apparatus for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, comprising a first comparator for detecting a wobbling signal formed on respective land/groove (L/G) tracks of the optical recording medium and slicing the wobbling signal by a first slice level, a reference signal generating section for generating a reference signal by exclusive-OR-gating an output signal of the first comparator and a fedback L/G discrimination signal and applying a phase locked loop (PLL) to an exclusive-OR-gated signal, and a signal generating section for discriminating a kind of the present track by checking whether the phase of the sliced wobbling signal is inverted using the reference signal and generating the L/G discrimination signal according to a result of discrimination.

The signal generating section comprises a second comparator for slicing the wobbling signal formed on the respective L/G tracks by a second slice level, and a flip-flop for receiving an output signal of the second comparator through its clock terminal and the reference signal through its data terminal, and generating the L/G discrimination signal by checking a phase level of the signal inputted to its data terminal at a rising point of the signal inputted to its clock terminal.

The signal generating section comprises a logic circuit for exclusive-OR-gating the reference signal and the sliced wobbling signal to output the L/G discrimination signal.

In still another aspect of the present invention, there is provided a track discriminating method for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the method comprising the steps of detecting information existing in a plurality of regions recorded on the header regions of the optical recording medium with their phases different, delaying at least one of the detected signals for a predetermined time, and discriminating a kind of the track by comparing phase levels of the detected signals having passed the delay step.

In still another aspect of the present invention, there is provided a track discriminating apparatus for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the apparatus comprising a detecting section for detecting information existing in a plurality of regions recorded on the header regions of the optical recording medium with their phases different, a delay section for delaying at least one of the detected signals for a predetermined time, and a signal generating section for discriminating a kind of the track by comparing phase levels of the detected signals having passed the delay step.

The delay section comprises a low pass filter for low-pass-filtering the respective detected signals by different bandwidths.

In still another aspect of the present invention, there is provided a track discriminating method for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the method comprising a first discriminating step of discriminating a kind of the track by obtaining a difference signal of optical reflection signals in a track direction of the optical recording medium, differentiating the difference signal, and slicing the differentiated difference signal by upper and lower reference levels, a second discriminating step of discriminating the kind of the track by detecting a phase of a wobbling signal formed on respective land/groove (L/G) tracks and checking whether the phase of the wobbling signal is inverted using a reference signal, a third discriminating step of discriminating the kind of the track by detecting information existing in a plurality of regions recorded on the header regions of the optical recording medium with their phases different, delaying at least one of the detected signals for a predetermined time, and comparing phase levels of the detected two signals, and a step of generating a land/groove (L/G) discrimination signal by selecting or combining at least one of discriminated results at the first to third steps.

In still another aspect of the present invention, there is provided a track discriminating apparatus for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the apparatus comprising a first discriminating section for discriminating a kind of the track by obtaining a difference signal of optical reflection signals in a track direction of the optical recording medium, differentiating the difference signal, and slicing the differentiated difference signal by upper and lower reference levels, a second discriminating section for discriminating the kind of the track by detecting a phase of a wobbling signal formed on respective land/groove (L/G) tracks and checking whether the phase of the wobbling signal is inverted using a reference signal, a third discriminating section for discriminating the kind of the track by detecting information existing in a plurality of regions recorded on the header regions of the optical recording medium with their phases different, delaying at least one of the detected signals for a predetermined time, and comparing phase levels of the detected two signals, and a signal generating section for generating a land/groove (L/G) discrimination signal by selecting or combining at least one of discriminated results at the first to third steps.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, the preferred embodiments of the present invention will be explained in detail with reference to the accompanying drawings.

Figure 10:
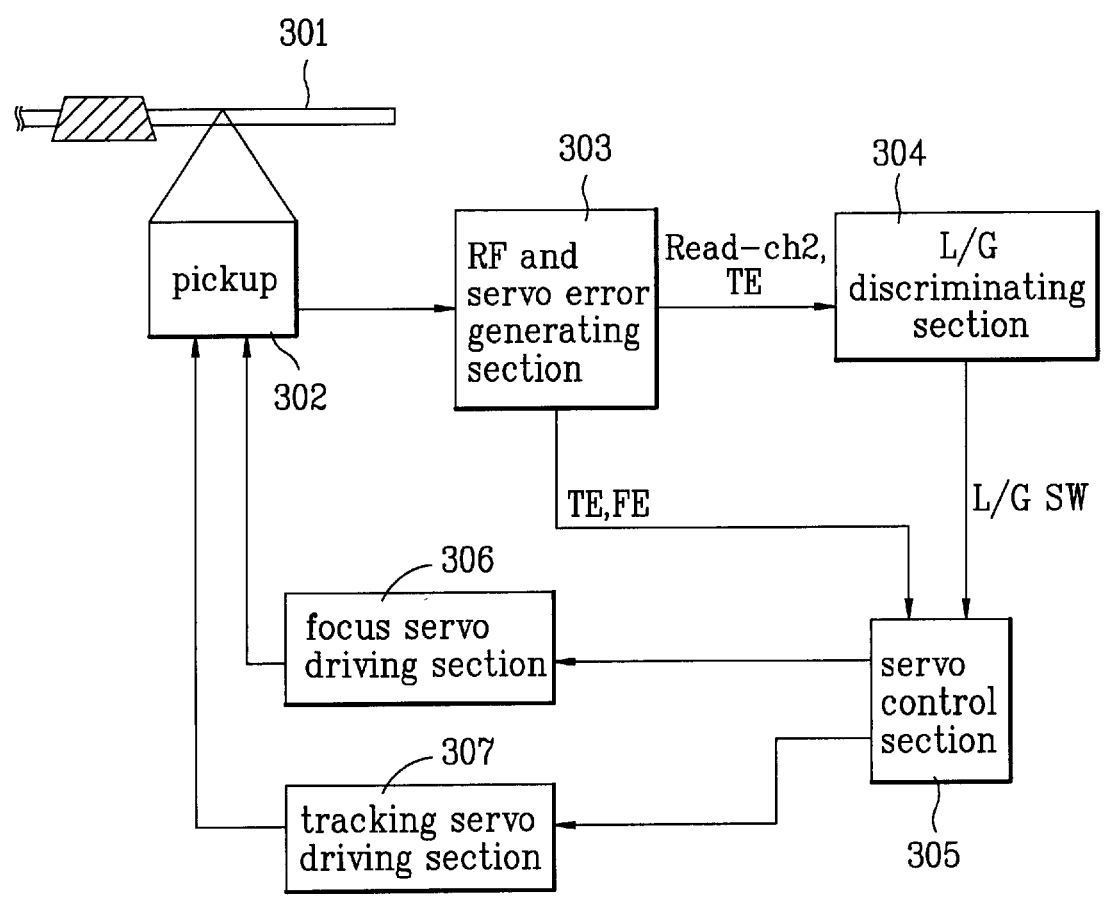
FIG. 10 is a block diagram briefly illustrating the construction of a track discriminating apparatus for an optical recording medium according to the present invention.

FIG. 10 is a block diagram briefly illustrating the construction of a track discriminating apparatus for an optical recording medium according to the present invention. Referring to FIG. 10, an L/G discriminating section 304 receives a read channel 2 signal or a tracking error signal generated from an RF and servo error generating section 303, discriminates whether the present track is the land or the groove accordingly, and then outputs a discrimination signal L/G SW to a servo control section 305.

At this time, the L/G discriminating section 304 can discriminate the kind of the track in diverse manners, and the first to third embodiments of the present invention will now be explained in order.

First Embodiment

The first embodiment of the present invention discriminates the kind of the track using the differential characteristic of optical reflection signals from the optical disc.

Figure 11:
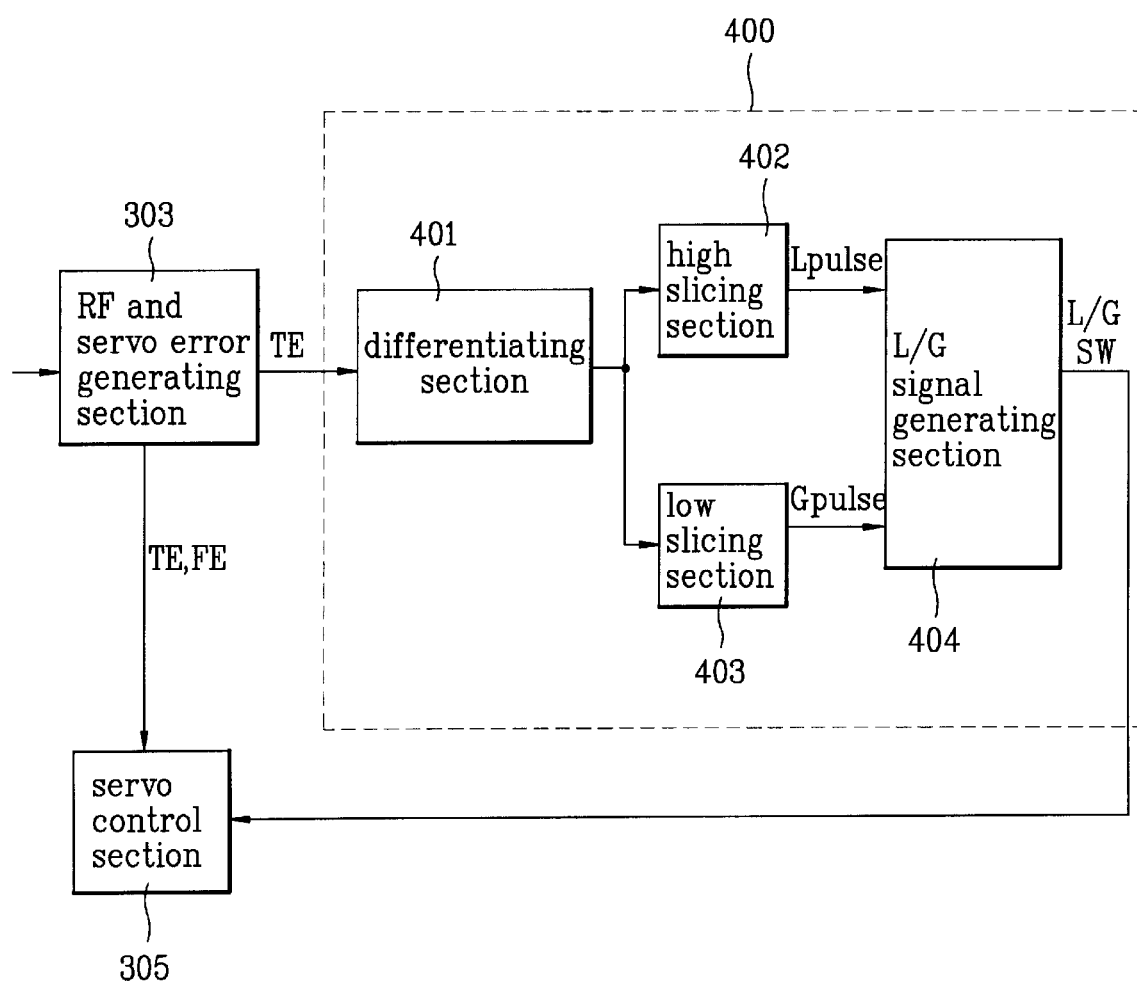
FIG. 11 is a block diagram of the track discriminating apparatus for an optical recording medium according to a first embodiment of the present invention.

FIG. 11 is a block diagram of the optical disc recording/reproducing apparatus according to a first embodiment of the present invention, and illustrates only the portions related to the land/groove track discrimination.

Referring to FIG. 11, an L/G discriminating section 400 includes a differentiating section for differentiating a tracking error signal TE generated from the RF and servo error generating section 303, a high slicing section 402 for outputting an Lpulse signal of a high level if the tracking error signal differentiated by the differentiating section 401 is higher than a first slice level, a low slicing section 403 for outputting a Gpulse signal of a high level if the tracking error signal differentiated by the differentiating section 401 is lower than a second slice level, and an L/G signal generating section 404 for discriminating whether the present track is the land track or the groove track according to slicing results Lpulse and Gpulse outputted from the high and low slicing sections 402 and 403, generating the L/G discrimination signal L/G SW according to a result of discrimination, and outputting the L/G discrimination signal to the servo control section 305.

In the first embodiment of the present invention as constructed above, the RF and servo error generating section 303 generates the tracking error signal TE, and outputs the tracking error signal to the servo control section 305 and to the differentiating section 401 of the L/G discriminating section 400 for L/G discrimination.

Figure 1:
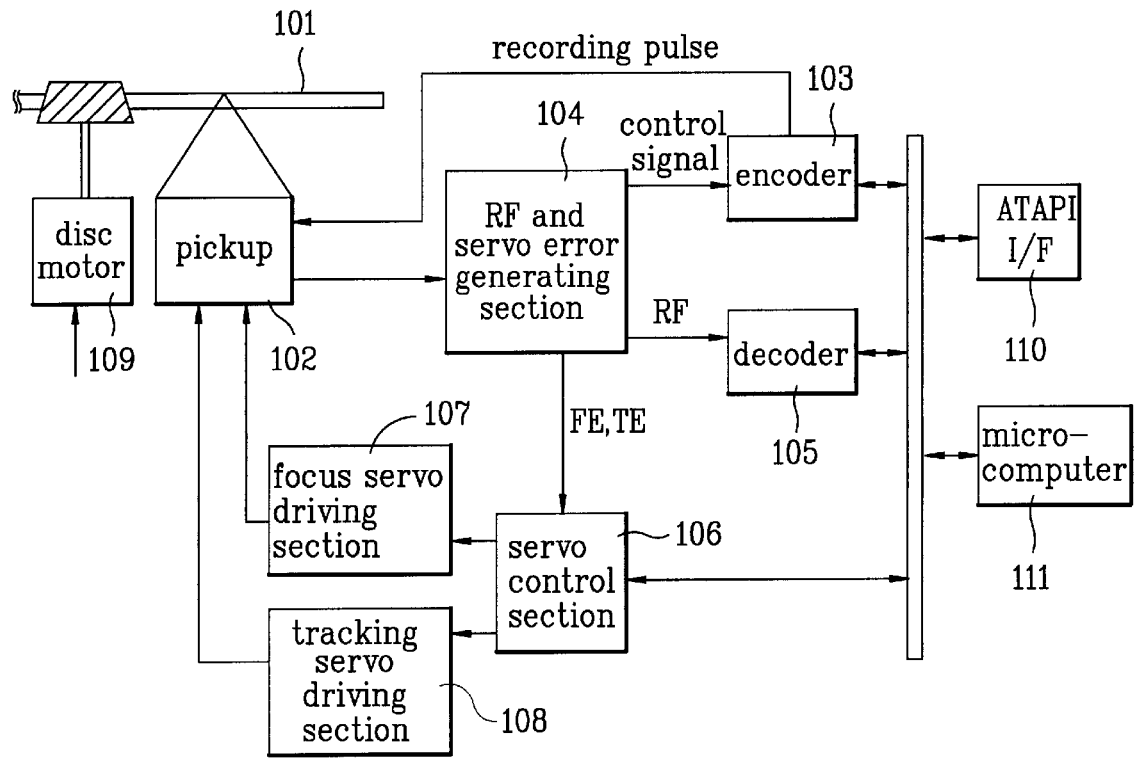
FIG. 1 is a block diagram illustrating the construction of a typical optical recording/reproducing apparatus.
Figure 2:
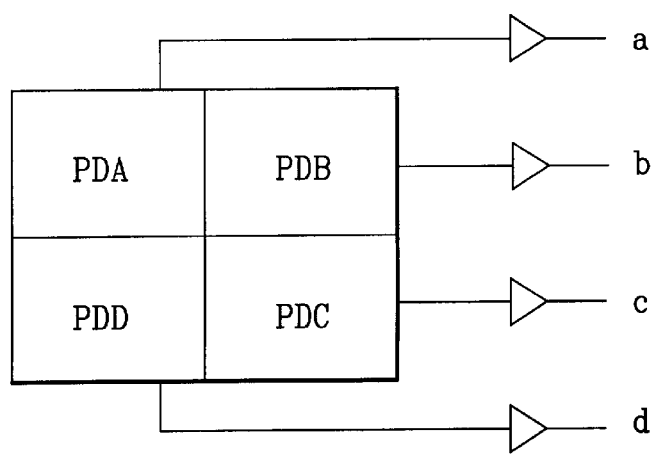
FIG. 2 is a view illustrating the construction of an optical detector in FIG. 1.
Figure 3:
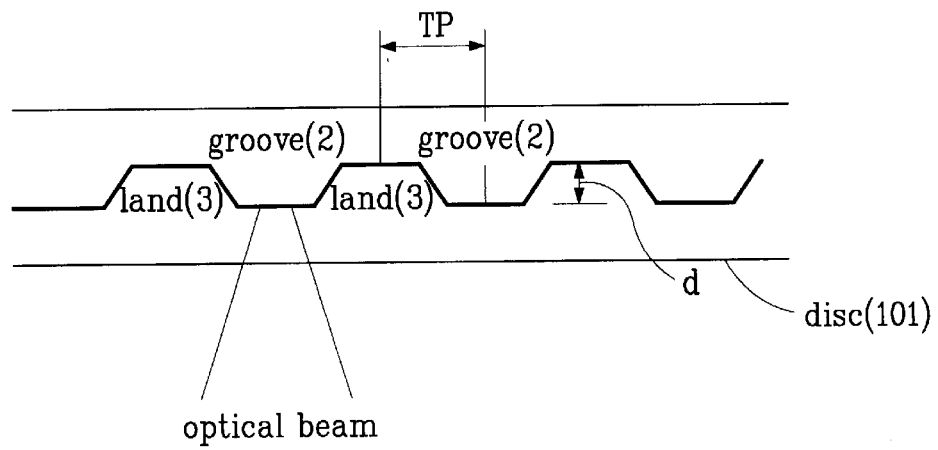
FIG. 3 is a view illustrating a typical disc having a land/groove track structure.
Figure 4:
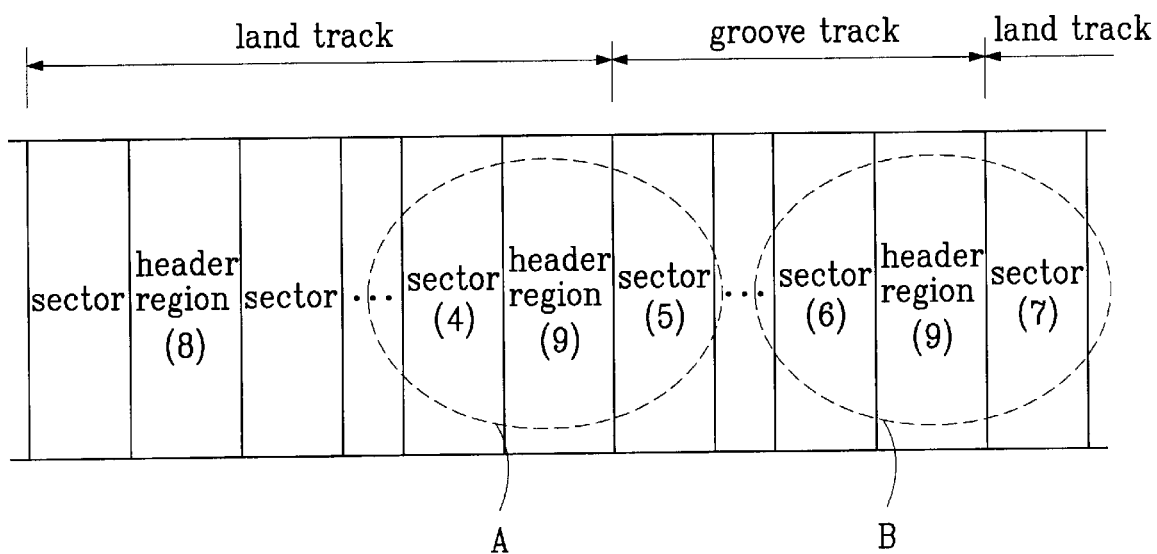
FIG. 4 is a view illustrating a data region and header region of a conventional track.
Figure 5:
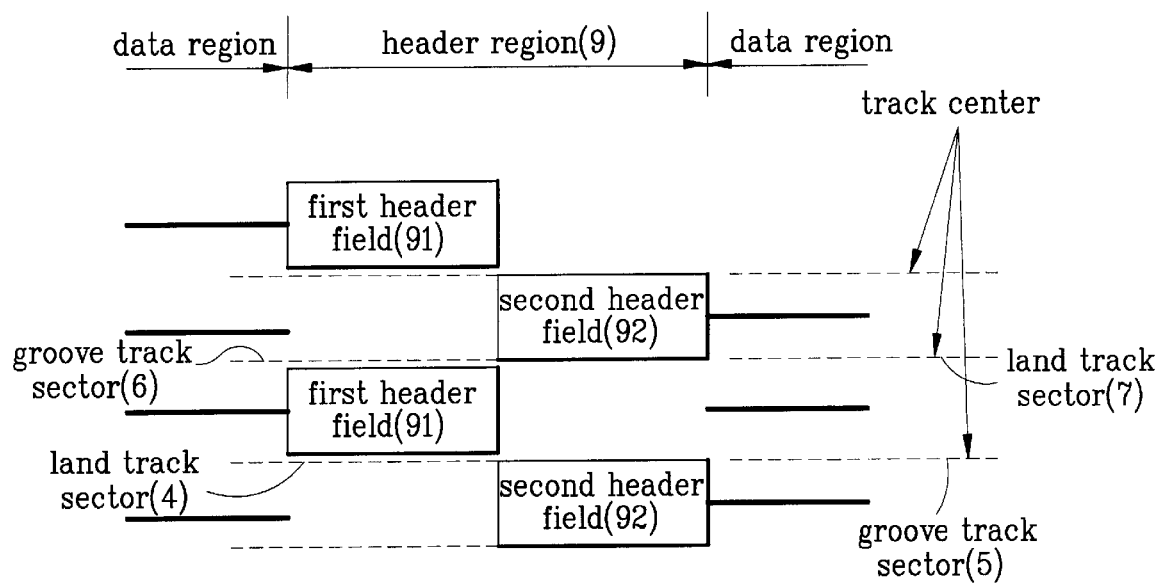
FIG. 5 is a view illustrating in detail 'A' and 'B' portions in FIG. 4 on the concentric circle of the disc.
Figure 13:
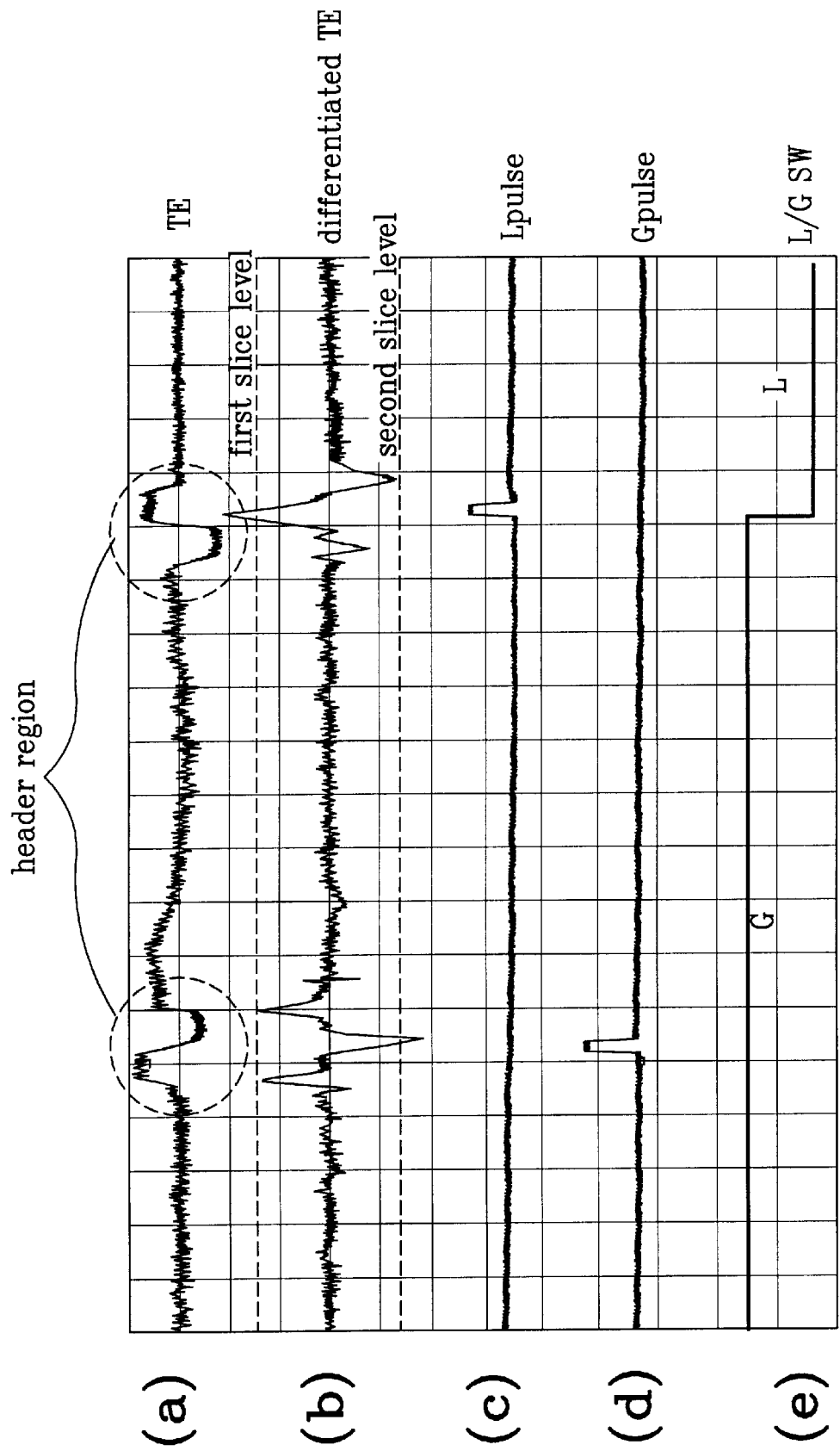
FIGS. 13(a) to 13(e) are waveform diagrams explaining the operation of respective elements of FIG. 11 for L/G discrimination.

The phase of the tracking error signal when the optical beam follows the land track is opposite to the phase of the tracking error signal when the optical beam follows the groove track in the header region as shown in FIG. 13(a). This is shown in the header region structure of FIG. 5.

At this time, the tracking error signal is unstable in DC level as shown in FIG. 13(a), and thus the differentiating section 401 stabilizes the DC level as shown in FIG. 13(b) by differentiating the tracking error signal. Specifically, if the tracking error signal passes through a capacitance (not illustrated) of the differentiating section 401, the DC level is covered, and the waving of the tracking error signal is removed as shown in FIG. 13(b). Also, in the header region, the tracking error signal is outputted in the form of a large impulse due to the differentiation, and the largest output signals have opposite directions to each other according to the land and groove tracks. This means the increase of the degree of freedom of the slice level, and in order to slice the differentiated tracking error signal by this slice level, the differentiated tracking error signal is outputted to the high and low slicing sections 402 and 403.

The high slicing section 402 produces and outputs to the L/G signal generating section 404 the Lpulse signal of a high level as shown in FIG. 13(C) only when the differentiated tracking error signal is higher than the first slice level. The low slicing section 403 produces and outputs to the L/G signal generating section 404 the Gpulse signal of a high level as shown in FIG. 13(d) only when the differentiated tracking error signal is lower than the second slice level. Here, the first slice level is highly determined to a degree that the differentiated tracking error signal detected from the groove track is not sliced, and only the differentiated tracking error signal detected from the land track as shown in FIG. 13(b), and the second slice level is determined low on the contrary to the first slice level.

The L/G signal generating section 404 switches the L/G discrimination signals using the input Lpulse and Gpulse signals. For instance, if a high level signal is detected from the Lpulse signal after a high level signal is continuously detected from the Gpulse signal for a predetermined period, the L/G discrimination signal L/G SW is switched, i.e., toggled at that time point, and vice versa.

Specifically, the L/G signal generating section 404 judges whether the track following the header region where the optical beam is currently positioned is the land track or the groove track according to the Lpulse and Gpulse signals, and then outputs to the servo control section 305 the L/G discrimination signal L/G SW for controlling the optical pickup 302 to follow the land track ro the groove track.

Figure 12:
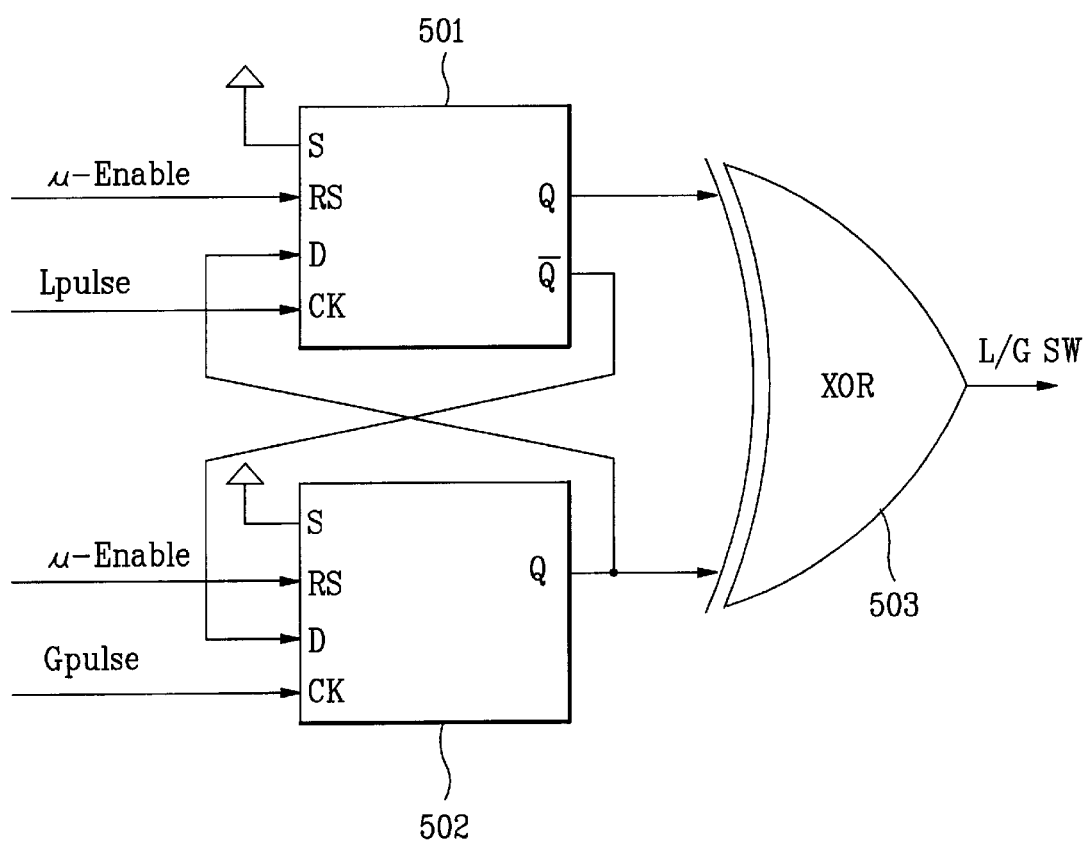
FIG. 12 is a block diagram illustrating an example of the signal generating section in FIG. 11.

FIG. 12 is a block diagram illustrating an example of the L/G signal generating section 404. Referring to FIG. 12, the L/G signal generating section 404 comprises first and second D-type flip-flops 501 and 502 having a set terminal S and a reset terminal RS, and an exclusive OR gate 503 for generating the L/G discrimination signal by exclusive-OR-gating output signals of the first and second D-type flip-flops 501 and 502.

Here, the set terminals of the first and second D-type flip-flops 501 and 502 are always kept in a high state, and the reset terminals thereof are reset by a u-Enable signal. The u-Enable signal, which is a low active signal, becomes 'high' only in a section where the L/G discrimination is required under the control of a microcomputer (not illustrated), and becomes 'low' otherwise to reset the first and second D-type flip-flops 501 and 502. That is, since the servo should be stable in order to secure the accuracy of the L/G discrimination, the servo is first set, and then the u-Enable signal becomes 'high'. Accordingly, when the servo is set, the initial outputs of the first and second D-type flip-flops 501 and 502 become 'low'.

To the clock terminal of the first D-type flip-flop 501 is inputted the Lpulse signal, and to the clock terminal of the second D-type flip-flop 502 is inputted the Gpulse signal. The Q output of the first D-type flip-flop 501 is outputted to the exclusive OR gate 503, and the Q-bar output thereof is outputted to the D-input terminal of the second D-type flip-flop 502. The Q output of the second D-type flip-flop 502 is outputted to the exclusive OR gate 503 and to the D-input terminal of the first D-type flip-flop 501.

Specifically, the first D-type flip-flop 501 outputs the signal which is inputted to its D-input terminal at the rising edge or in the 'high' period of the Lpulse signal, and maintains its previous state otherwise. The second D-type flip-flop 502 outputs the signal which is inputted to its D-input terminal at the rising edge or in the 'high' period of the Gpulse signal, and maintains its previous state otherwise.

At this time, since the Q outputs of the first and second D-type flip-flops 501 and 502 are 'low' in all at an initial state, the output of the exclusive OR gate 503 becomes 'high'. To the D-input terminal of the first D-type flip-flop 501 is inputted the 'low' signal, and to the D-input terminal of the second D-type flip-flop 502 is inputted the 'high' signal. However, since the Lpulse signal and the Gpulse signal are not changed at the initial state, the Q outputs of the first and second flip-flops 501 and 502 are kept in the 'low' state.

Then, for example, if the Gpulse signal becomes 'high' as shown in FIG. 13(d), the second D-type flip-flop 502 outputs through its Q output terminal the 'high' signal which is inputted to its clock terminal to the exclusive OR gate 503 and to the D-input terminal of the first D-type flip-flop 501.

At this time, since the Lpulse signal inputted to the clock terminal of the first D-type flip-flop 501 is not changed, the first D-type flip-flop 501 maintains its previous state, i.e., the 'low' state. Specifically, the first D-type flip-flop 501 continuously outputs the 'low' signal to the exclusive OR gate 503 through its Q output terminal, and continuously outputs the 'high' signal to the second D-type flip-flop 502 through its Q-bar output terminal.

Accordingly, since the exclusive OR gate 503 receives the 'low' signal from the first D-type flip-flop 501 and the 'high' signal from the second D-type flip-flop 502, the output of the exclusive OR gate 503 goes from the 'low' state to the 'high' state, and the second D-type flip-flop 502 maintains the 'high' state. This state is continuously kept so far as the Gpulse signal as shown in FIG. 13(d) is inputted.

Then, if the optical beam follows the land track, i.e., if the Lpulse signal becomes 'high' as shown in FIG. 13(c), the first D-type flip-flop 501 outputs the 'high' signal which is inputted to its D-input terminal to the exclusive OR gate 503 through its Q output terminal, and output the 'low' signal to the D-input terminal of the second D-type flip-flop 502 through its Q-bar output terminal. At this time, since the Gpulse signal provided as a clock of the second D-type flip-flop 502 is not changed, the second D-type flip-flop 502 maintains its previous state, i.e., the 'high' state.

However, since the two inputs of the exclusive OR gate 503 become 'high', the output of the exclusive OR gate 503 goes from the 'high' state to the 'low' state. The output of the exclusive OR gate 503 will be the L/G discrimination signal L/G SW.

The above process is repeated whenever the Lpulse signal and the Gpulse signal are generated.

Accordingly, if the L/G discrimination signal L/G SW represents the land track, i.e., if the L/G discrimination signal is 'low', the servo control section 305 generates and outputs to the tracking driving section 307 the tracking error signal which is offset-adjusted to match the land and then inverted as a tracking driving signal. If the L/G discrimination signal L/G SW represents the groove track, i.e., if the L/G discrimination signal is 'high', the servo control section 305 generates and outputs to the tracking driving section 307 the tracking error signal which is offset-adjusted to match the groove as a tracking driving signal.

For convenience in explanation, the first embodiment of the present invention exemplifies the case that the present track switches over from the groove track to the land track. However, the present invention is applied to the opposite case in the same manner.

Second Embodiment

The second embodiment of the present invention discriminates the kind of the track from the wobbling signal in the land/groove recording type medium having the wobbling structure.

Figure 6:
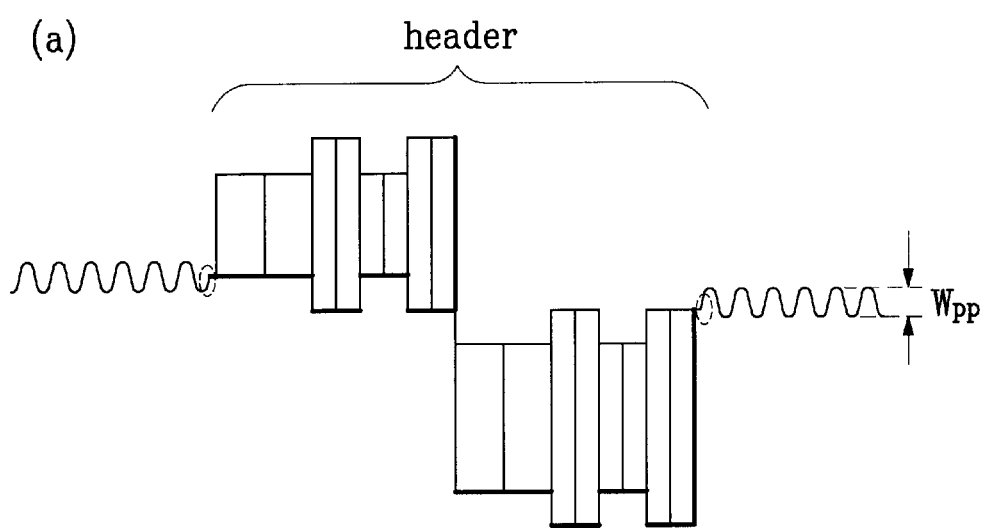
FIG. 6(a) is a view illustrating an example of a wobbling signal detected from the groove track.
FIG. 6(b) is a view illustrating an example of a wobbling signal detected from the land track.
Figure 6:
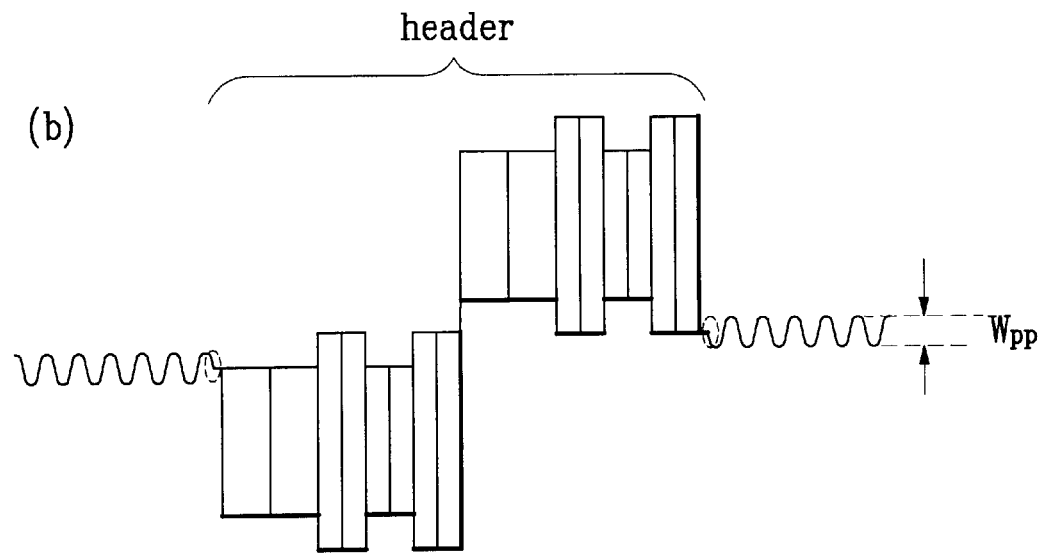
Figure 7:
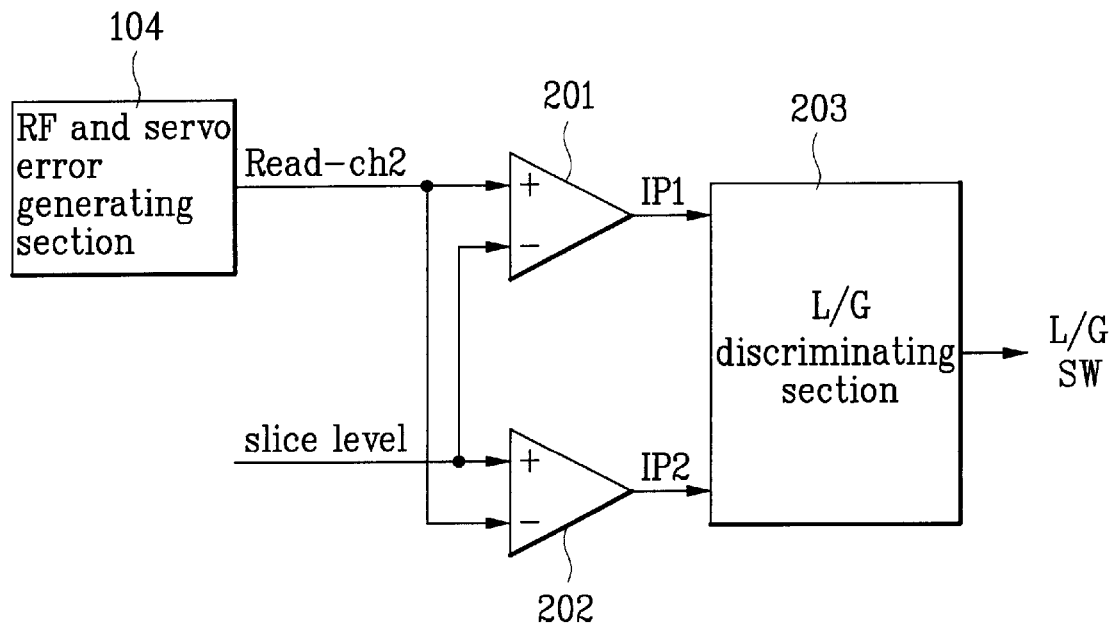
FIG. 7 is a block diagram of a conventional L/G discriminating apparatus.
Figure 8:
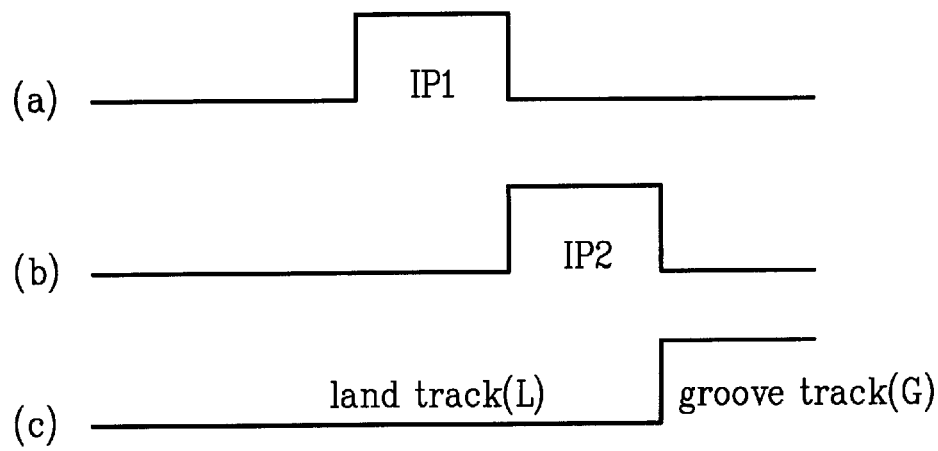
FIGS. 8(a) to 8(C) are waveform diagrams explaining the operation of respective elements of FIG. 7 when the land track switches over to the groove track.
Figure 9:
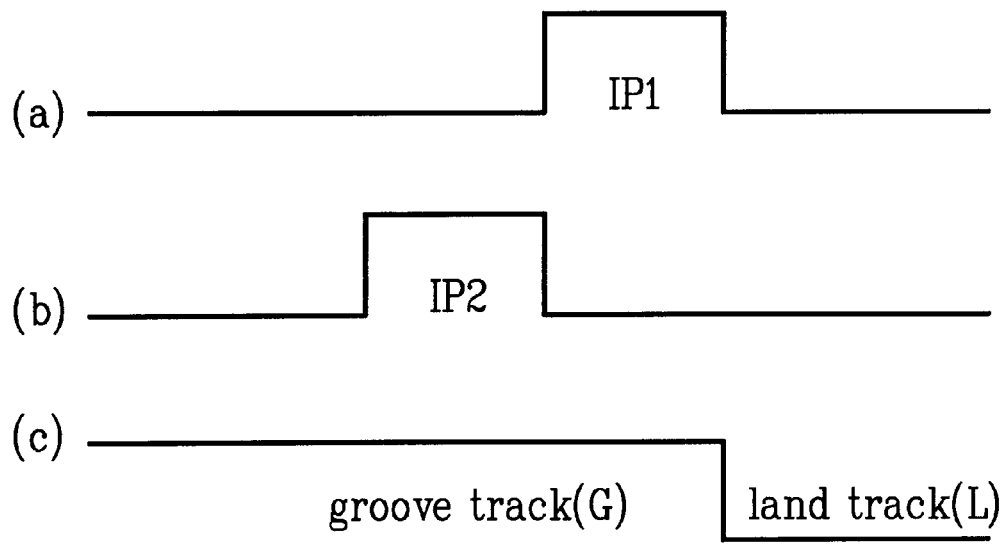
FIGS. 9(a) to 9(C) are waveform diagrams explaining the operation of the respective elements of FIG. 7 when the groove track switches over to the land track.

Referring to FIG. 6, on the basis of the header region, the wobbling signal on the grove track starts from the rising edge and ends to the rising edge as shown in FIG. 6(a), and the wobbling signal on the land track starts from the falling edge and ends to the falling edge as shown in FIG. 6(b).

Accordingly, the second embodiment of the present invention discriminates the L/G track using the characteristic that the phase of the wobbling signal on the land track is opposite to the phase of the wobbling signal on the groove track by 180 degrees.

Figure 14:
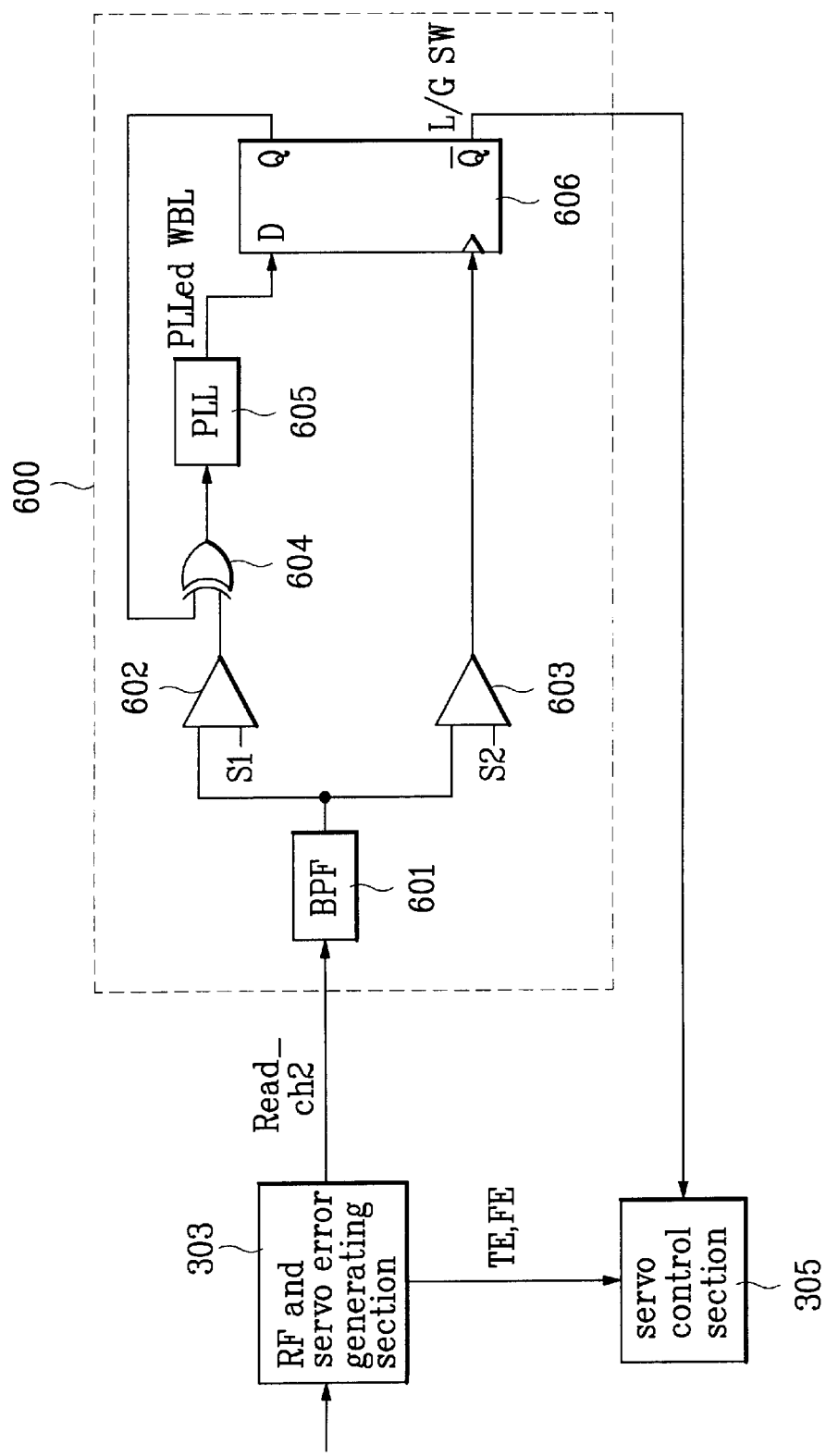
FIG. 14 is a block diagram of the track discriminating apparatus for an optical recording medium according to a second embodiment of the present invention.

FIG. 14 is a block diagram of the land/groove track discriminating apparatus for an optical recording medium according to a second embodiment of the present invention.

Referring to FIG. 14, an L/G discriminating section 600 comprises a band pass filter (BPF) 601 for detecting the wobbling signal by band-pass-filtering the read channel 2 signal outputted from the RF and servo error generating section 303, a first comparator 602 for slicing the detected wobbling signal by a first slice level S1, a second comparator 603 for slicing the detected wobbling signal by a second slice level S2, an exclusive OR gate 404 for exclusive-OR-gating an output of the first comparator 602 and a fedback inverted L/G discrimination signal, a PLL section 605 for applying a PLL to an output of the exclusive OR gate 604, and a D-type flip-flop 606 for receiving the PLL wobbling signal through its data terminal and an output of the second comparator 603 through its clock terminal, outputting the L/G discrimination signal L/G SW through its Q-bar output terminal, and feeding its Q output back to the exclusive OR gate 604.

According to the second embodiment of the present invention as constructed above, the RF and servo error generating section 303 generates the read channel 2 signal and outputs it to the BPF 601 in the L/G discriminating section 600. Here, the wobbling signal can be detected from the read channel 2 signal.

Specifically, if the read channel 2 signal is band-pass-filtered through the BPF 601, the wobbling signal as shown in FIG. 15(a) is detected. At this time, the first comparator 602 sets the center level of the wobbling signal as the first slice level S1, slices the wobbling signal thereby, and outputs the sliced wobbling signal to the exclusive OR gate 604 as shown in FIG. 15(b). The second comparator 603 sets the level lower than the center level of the wobbling signal as the second slice level S2, slices the wobbling signal thereby, and outputs the sliced wobbling signal to the clock terminal of the D-type flip-flop 606 as shown in FIG. 15(c).

The exclusive OR gate 604 exclusive-OR-gates the wobbling signal sliced by the first slice level S1 and the inverted L/G discrimination signal fed back from the Q output terminal of the D-type flip-flop 606 to output the exclusive-OR-gated signal to the PLL section 605.

The PLL section 605 applies the PLL to the output of the exclusive OR gate 604 and provides its output to the data terminal of the d-type flip-flop 606.

Here, the reason why the PLL is applied to the wobbling signal is to prevent the phase from being changed according to the land/groove tracks. Specifically, the PLL wobbling signal has a constant frequency of the same phase irrespective of the land/groove tracks or the header region. At this time, no wobbling signal is originally recorded in the header region. However, if the wobbling signal is held in the header region as a signal preceding the header region, the wobbling signal can have a constant frequency of the same phase in the header region as shown in FIG. 15(d).

Especially, since the wobbling signals in the land track and the groove track have the phase difference of 180 degrees, the wobbling signal may wave at the moment of L/G switching, and it can be prevented. Accordingly, to the data terminal of the D-type flip-flop 606 is inputted the wobbling signal having the same phase.

Meanwhile, if it is determined that the L/G discrimination signal L/G SW is low in the groove track, and is high in the land track, the phase of the PLL wobbling signal is equal to the phase of the original wobbling signal in the groove track, and is opposite to the phase of the original wobbling signal in the land track.

Also, if it is determined that the L/G discrimination signal L/G SW is low in the land track, and is high in the groove track, the phase of the PLL wobbling signal is equal to the phase of the original wobbling signal in the land track.

Accordingly, the present invention discriminates whether the track where the optical beam is currently positioned is the land track or the groove track using the above-described characteristic.

In the embodiment of the present invention, it is assumed that the L/G discrimination signal L/G SW is high in the groove track, and is low in the land track.

If the PLL wobbling signal inputted to the data terminal at the rising edge of the signal inputted to its clock terminal is low, the D-type flip-flop 606 outputs the low signal to the exclusive OR gate 604 through its Q output terminal, and output the high signal to the servo control section 305 through its Q-bar output terminal. Also, if the PLL wobbling signal is high, the D-type flip-flop 606 outputs the high signal to the exclusive OR gate 604 through its Q output terminal, and output the low signal to the servo control section 305 through its Q-bar output terminal. The signal outputted through the Q-bar output terminal of the D-type flip-flop 606 will be the L/G discrimination signal L/G SW as shown in FIG. 15(e).

In the embodiment of the present invention, the rising edge of the clock signal is exemplified. However, the L/G track may be discriminated using the falling edge, or the PLL wobbling signal in the high or low state.

Figure 15:
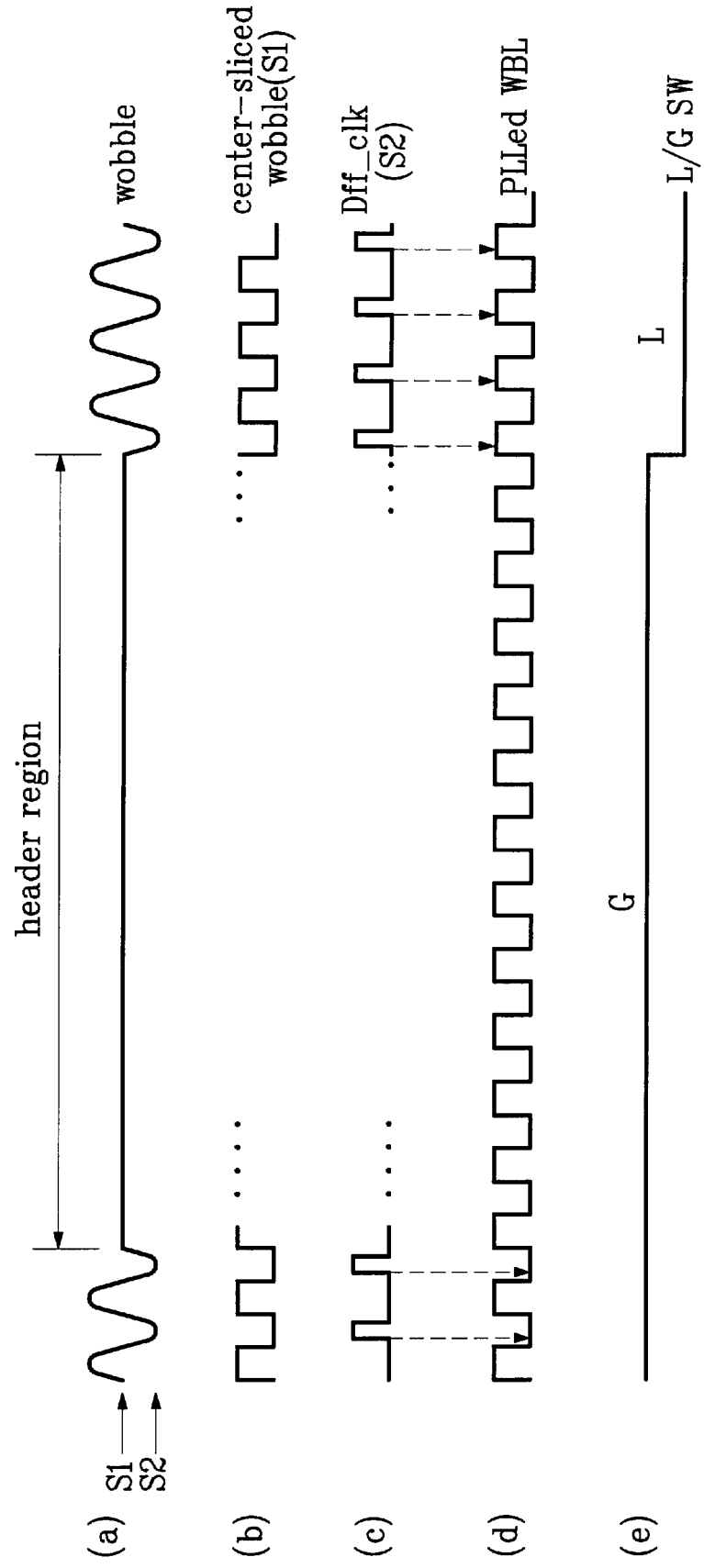
FIGS. 15(a) to 15(e) are waveform diagrams explaining the operation of respective elements of FIG. 14 for L/G discrimination.

Referring to FIG. 15, in case of the groove track, the PLL wobbling signal at the rising edge of the clock signal is in the low state, while in case of the land track, the PLL wobbling signal at the rising edge of the clock signal is in the high state.

If it is assumed that the L/G discrimination signal L/G SW is low in the groove track and is high in the land track, the Q output of the D-type flip-flop 606 will be the L/G discrimination signal.

Though the second embodiment of the present invention uses the D-type flip-flop 606 for the L/G discrimination, any flip-flop which can perform the same role as the D-type flip-flop can also be used.

Meanwhile, the present invention can also perform the L/G discrimination using an exclusive OR gate 705 as shown in FIG. 14 instead of the D-type flip-flop. Specifically, the L/G discrimination signal L/G SW as shown in FIG. 17(d) can also be obtained by exclusive-OR-gating the PLL wobbling signal as shown in FIG. 17(a) and the original wobbling signal sliced by the center level S3 as shown in FIG. 17(b).

Figure 16:
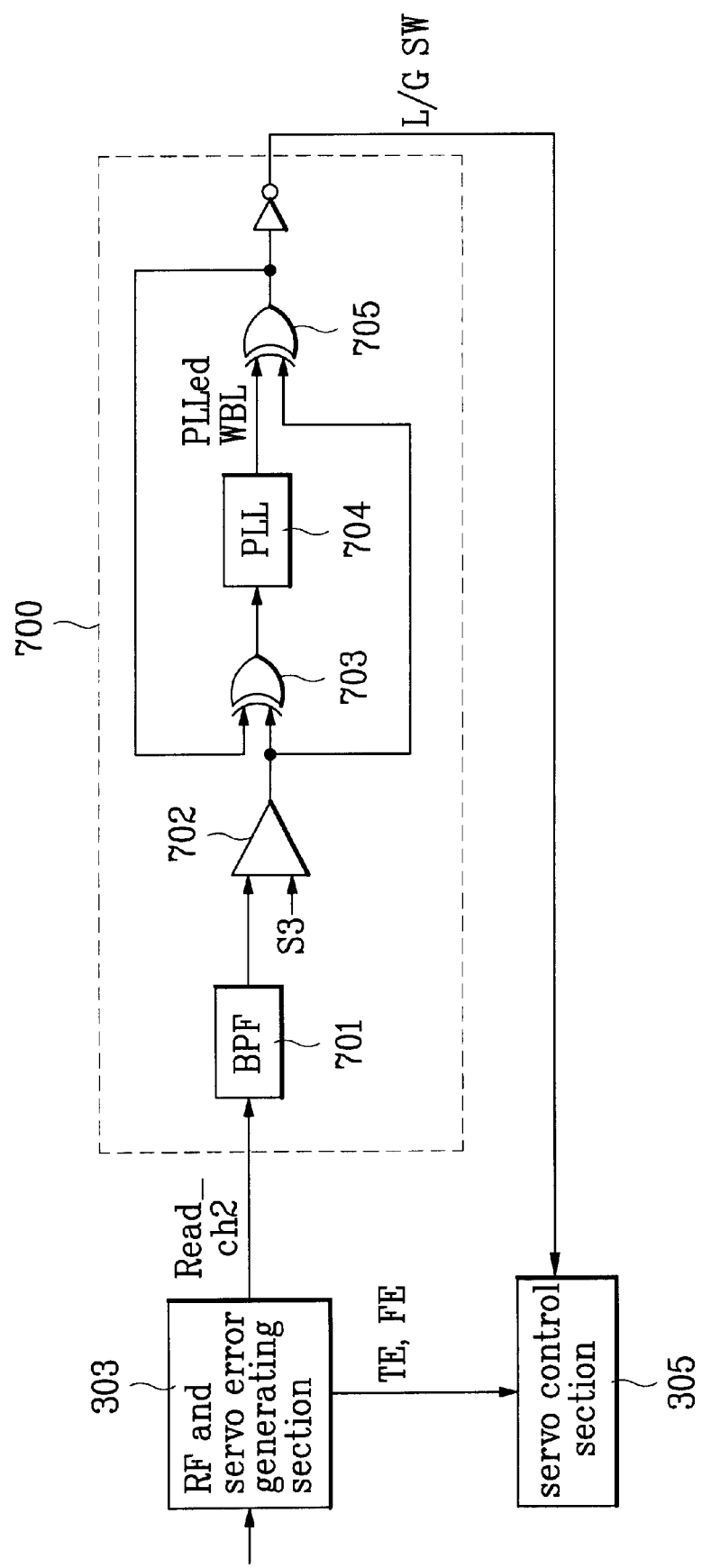
FIG. 16 is a block diagram illustrating another example of the track discriminating apparatus for an optical recording medium according to the second embodiment of the present invention.
Figure 17:
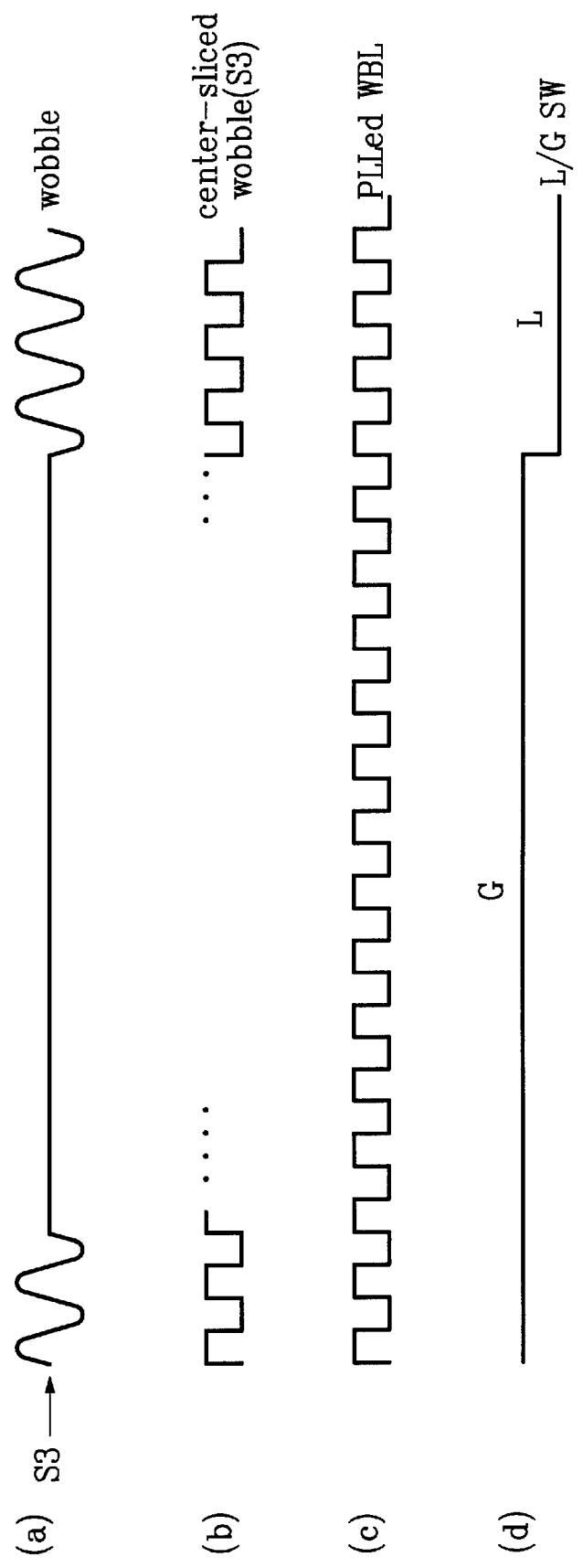
FIGS. 17(a) to 17(d) are waveform diagrams explaining the operation of respective elements of FIG. 16 for L/G discrimination.

At this time, if it is assumed that the L/G discrimination signal L/G SW is low in the groove track and is high in the land track, the output of the exclusive OR gate 705 will be the L/G discrimination signal. On the contrary, if it is assumed that the L/G discrimination signal L/G SW is high in the groove track and is low in the land track, the output of the exclusive OR gate 705 is inverted to be used as the L/G discrimination signal as shown in FIGS. 16 and 17.

In the embodiment of the present invention, the exclusive OR gate 705 is exemplified. However, any gate combination which can perform the exclusive OR function can also be used instead.

The difference between the case of using the D-type flip-flop and the case of using the exclusive OR gate is that the former case provides more stable operation than the latter case since the former case uses the clock signal for the discrimination.

Accordingly, if the L/G discrimination signal L/G SW represents the land track, the servo control section 305 generates and outputs to the tracking driving section 307 the tracking error signal which is offset-adjusted to match the land and then inverted as a tracking driving signal. If the L/G discrimination signal L/G SW represents the groove track, the servo control section 305 generates and outputs to the tracking driving section 307 the tracking error signal which is offset-adjusted to match the groove as a tracking driving signal.

For convenience in explanation, the second embodiment of the present invention exemplifies the case that the present track switches over from the groove track to the land track. However, the present invention is applied to the opposite case in the same manner.

Third Embodiment

The third embodiment of the present invention discriminates the kind of the track by delaying first and second header region signals for a predetermined time and comparing phases of the two signals.

Figure 18:
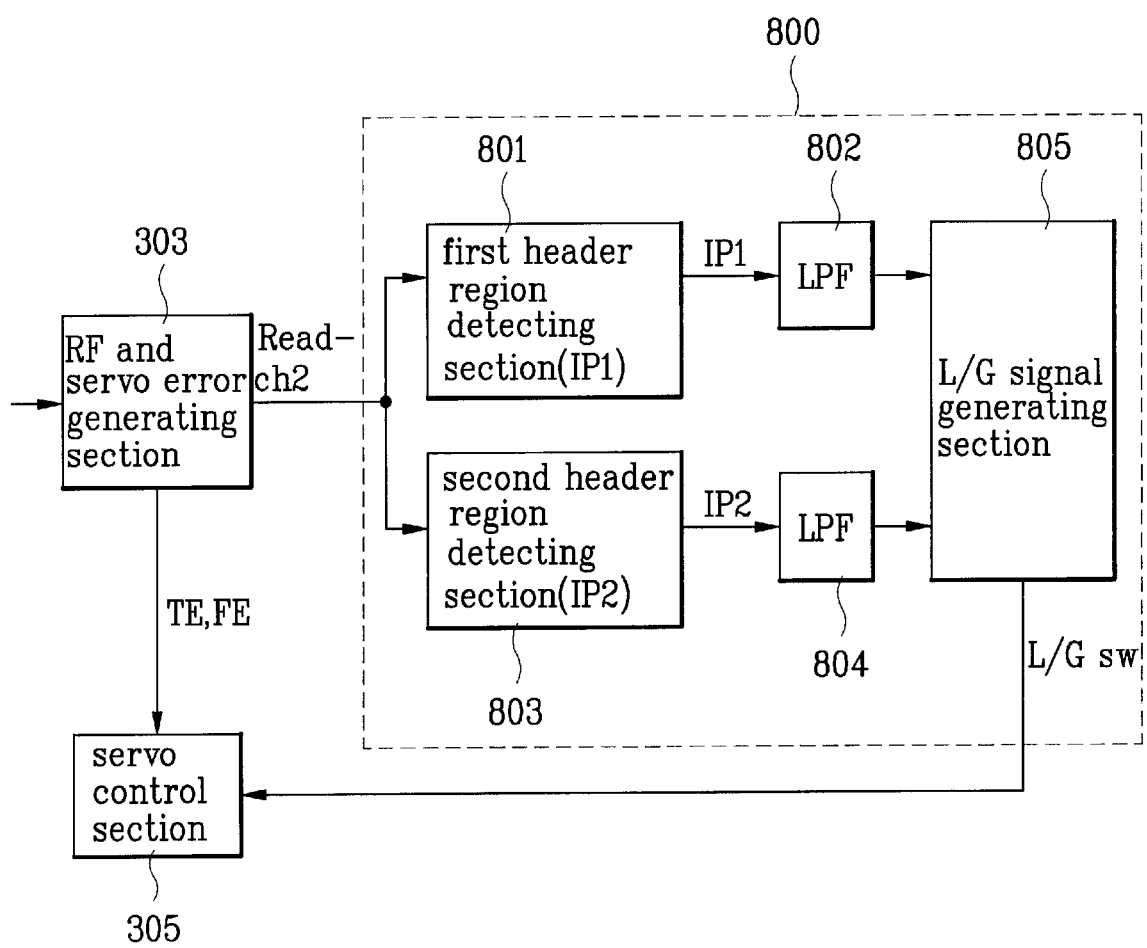
FIG. 18 is a block diagram of the track discriminating apparatus for an optical recording medium according to a third embodiment of the present invention.

FIG. 18 is a block diagram of the track discriminating apparatus for an optical recording medium according to a third embodiment of the present invention, and illustrates only the portion related to the L/G discrimination.

Referring to FIG. 18, an L/G discriminating section 800 comprises a first detecting section 801 for receiving the read channel 2 signal generated from the RF and servo error generating section 303 and outputting a first header region signal IP1 if the read channel 2 signal is higher than a predetermined slice level, a first delay section 802 for delaying the first header region signal IP1, a second detecting section 804 for outputting a second header region signal IP2 if the read channel 2 signal is lower than the predetermined slice level, a second delay section 804 for delaying the second header region signal IP2, and an L/G signal generating section 805 for judging whether the present track is the land track or the groove track using the first and second header region signals IP1 and IP2 delayed through the first and second delay sections 802 and 804 and generating a corresponding L/G discrimination signal L/G SW.

The first and second detecting sections 801 and 803 may detect the first and second header region signals using the read channel 2 signal, or by slicing the tracking error signal.

In the preferred embodiment of the present invention, the first and second delay sections 802 and 804 comprise low pass filters since the low pass filters can vary the delay amount by adjusting the filter bandwidth as well as they can remove an unwanted signal due to noise.

According to the present invention, a low pass filter having a wide bandwidth is used for the first header region signal IP1 so as to cause almost no delay, and a low pass filter having a narrow bandwidth is used for the second header region signal IP2 so as to cause a delay more than the first header region signal IP2. In other words, the LPF of the second delay section 804 has a narrow bandwidth relative to the LPF of the first delay section 802.

The signals passing through the first and second delay sections 802 and 804 are inputted to an L/G signal generating section 805. The L/G signal generating section 805 compares phase levels of the first and second header region signals delayed for a predetermined delay amount, and switches the L/G discrimination signal L/G SW according to a result of comparison.

Figure 20:
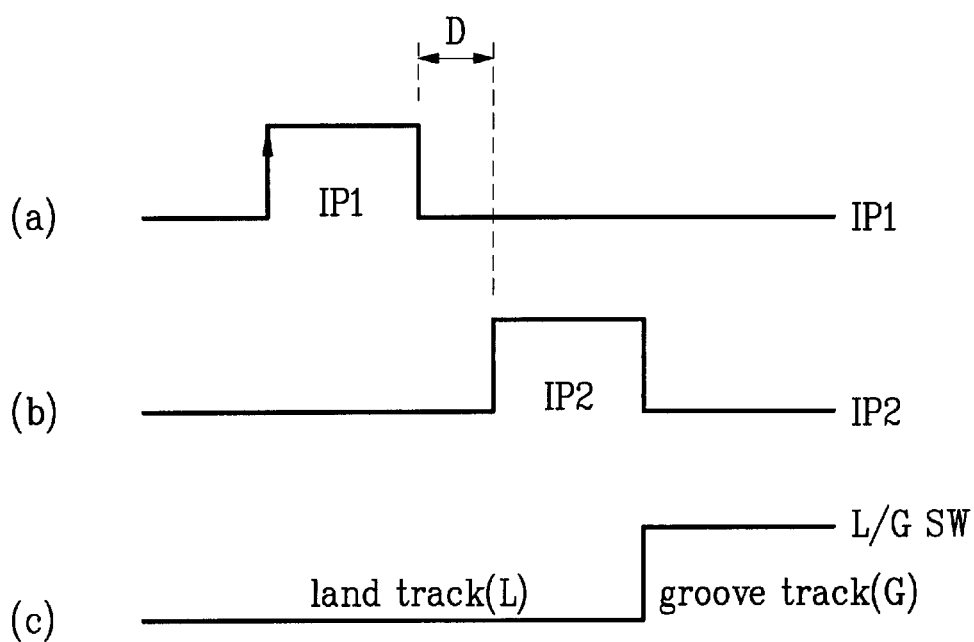
FIGS. 20(a) to 20(C) are waveform diagrams explaining the operation of respective elements of FIG. 18 when the land track switches over to the groove track.
Figure 21:
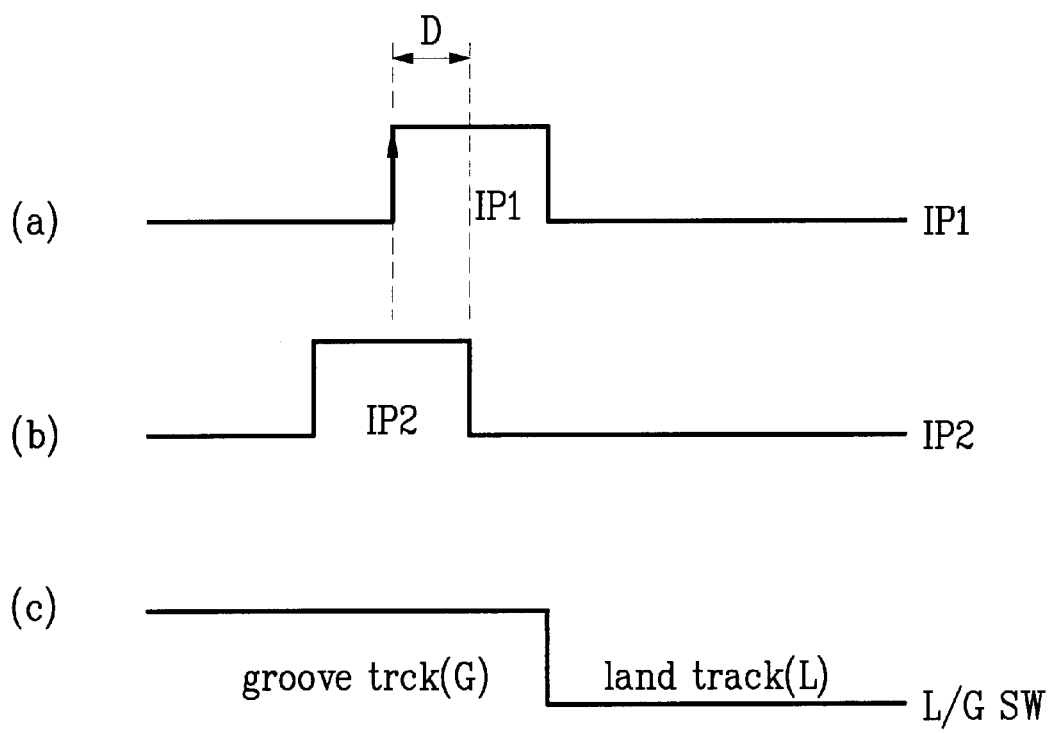
FIGS. 21(a) to 21(C) are waveform diagrams explaining the operation of the respective elements of FIG. 18 when the groove track switches over to the land track.

Hereinafter, the third embodiment of the present invention will be explained in detail with reference to FIGS. 19 to 21.

Figure 19:
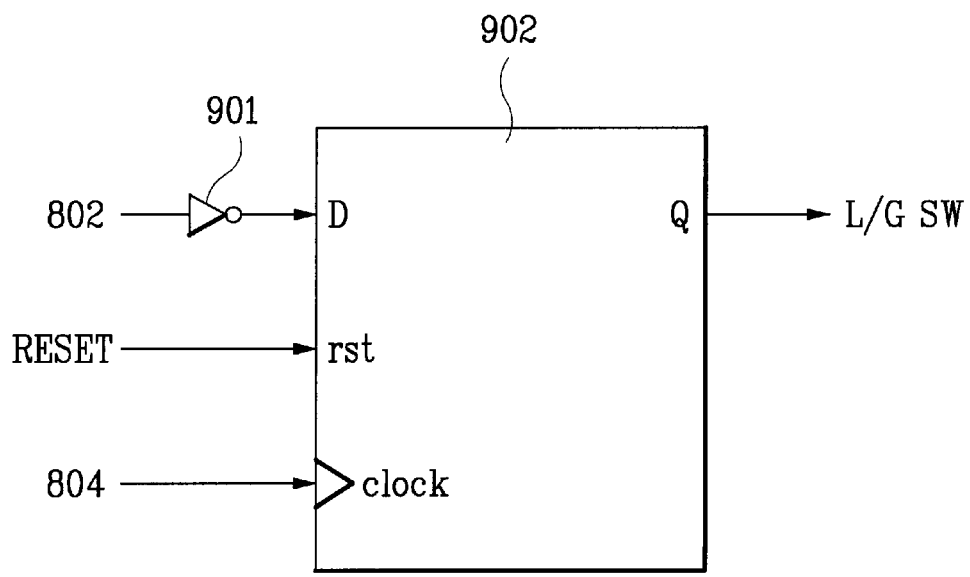
FIG. 19 is block diagram illustrating an example of the signal generating section in FIG. 18.

FIG. 19 is a view illustrating an example of the L/G signal generating section 805. In the embodiment of the present invention, the L/G signal generating section 805 comprises a simple logic element, i.e., a D-type flip-flop.

First, the signal passing through the first delay section 802 is used as a clock, and the signal passing through the second delay section 804 is used as data. At this time, the reset signal of the D-type flip-flop 902 is controlled by a microcomputer (not illustrated).

FIGS. 20(a) to 20(c) are waveform diagrams explaining the track discrimination at the time point where the track switches over from the land track to the groove track according to the third embodiment of the present invention. FIG. 20(a) shows the waveform of the first header region signal IP1 having passed through the first delay section 802, and FIG. 20(b) shows the waveform of the second header region signal IP2 having passed through the second delay section 804. At this time, it is assumed that the first and second delay sections 802 and 804 are designed so that the delay amount of the second header region signal IP2 is more than that of the first header region signal IP1 by the amount of 'D'.

When the first and second header region signals IP1 and IP2 are inputted to the D-type flip-flop 902 of FIG. 19, the D-type flip-flop 902 output the phase level of the second header region signal IP2 at the rising point of the first header region signal IP1.

At this time, the second header region signal IP2 is inverted by an inverter 901, and then inputted as the data of the D-type flip-flop 902. Accordingly, the L/G discrimination signal L/G SW as shown in FIG. 20(c) is outputted. That is, since the second header region signal IP2 which is inverted at the rising edge of the first header region signal IP1 is 'high', the L/G switching signal L/G SW goes from the 'low' state to the 'high' state at the rising edge of the first header region signal IP1 as shown in FIG. 20(c).

FIGS. 21(a) to 21(c) are waveform diagrams explaining the track discrimination at the time point where the track switches over from the groove track to the land track according to the third embodiment of the present invention. The detailed explanation thereof is equal to that of the track discrimination referring to FIGS. 20(a) to 20(c). In this case, since the second header region signal which is inverted at the rising edge of the first header region signal IP1 is 'low', the L/G discrimination signal L/G SW goes from the 'high' state to the 'low' state at the rising edge of the first header region signal IP1 as shown in FIG. 21(c).

Here, the reason why the second header region signal IP2 is inverted and then inputted to the D-type flip-flop 902 is to discriminate that the present track is the grove track when the L/G discrimination signal L/G SW is 'high', and the present track is the land track when the L/G discrimination signal is 'low'. If it is intended to obtain the L/G discrimination signal L/G SW in an opposite manner, the inverter 901 of FIG. 19 is not required. In other words, the use of the inverter 901 is optional to a designer.

Though the third embodiment of the present invention uses the D-type flip-flop 902 for the L/G discrimination, any type of flip-flop which can perform the same role as the D-type flip-flop can be used instead.

As described above, the third embodiment of the present invention discriminates the track switchover time point only when both the first and second header region signals are detected and the respective phases are properly outputted, and outputs a new kind of track signal, thereby enabling much more stable track discrimination in comparison to the prior art.

Figure 22:
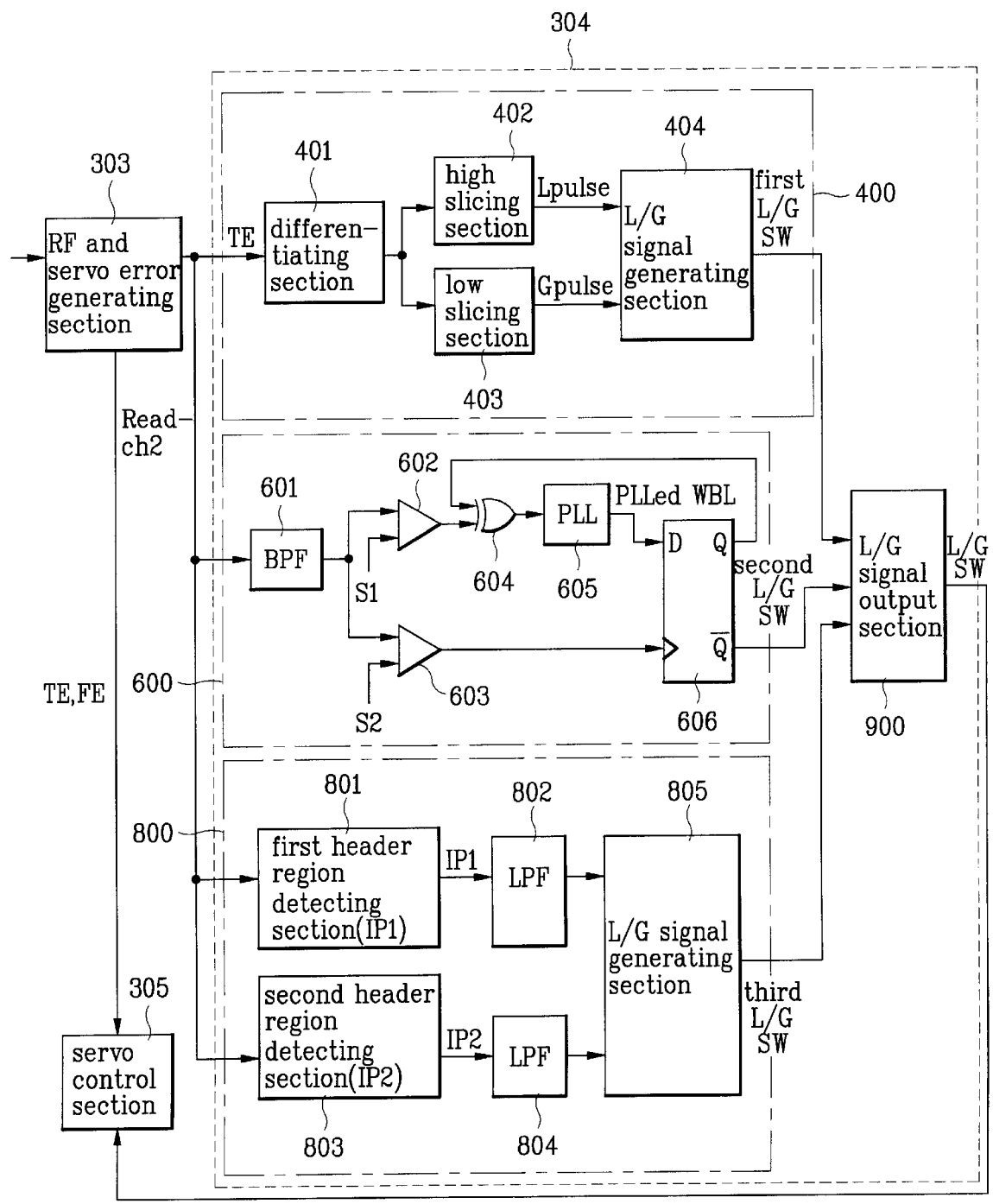
FIG. 22 is a block diagram of the track discriminating apparatus for an optical recording medium using the first to third embodiments of the present invention.

FIG. 22 is a block diagram of the track discriminating apparatus for an optical recording medium using the first to third embodiments of the present invention in all. Referring to FIG. 22, the construction and operation of a first L/G discriminating section 400, second L/G discriminating section 600 and third L/G discriminating section 800 are the same as those already explained according to the first to third embodiments of the present invention.

An L/G signal output section 900 outputs the final L/G discrimination signal to the servo control section 305 by selecting or combining at least one among the first to third L/G discrimination signals outputted from the first to third L/G discriminating sections 400, 600, and 800. Specifically, the L/G signal output section 900 may select and output one among the first to third L/G discrimination signals, or may logically combining at least one among the first to third L/G discrimination signals using a logic element and then output a resultant signal of combination. This can be determined by the designer.

As described above, according to the track discriminating method and apparatus for an optical recording medium according to the present invention, the kind of a track is discriminated using the differential characteristic of the tracking error signal in the header region, and thus an accurate tracking control can be performed for the optical disc having the land and groove track structure. Also, the present invention can perform an accurate and stable land/groove discrimination without detection of the header region by detecting the track using the relation that the phase of the wobbling signal in the lang track is opposite to the phase of the wobbling signal in the groove track. Also, even in an unstable servo state of the system, the present invention can stably discriminate the kind of the track by comparing the phase levels of the delayed first and second header region signals. As a result, according to the present invention, the servo control suitable to the kind of the track can be performed at a proper time, and thus a stable optical recording/reproduction can be achieved by the optical recording/reproducing apparatus.

Meanwhile, in the embodiments of the present invention, a rewritable optical recording medium is exemplified. However, it will be recognized that the present invention can also be applied to any type of optical recording medium which has the land and groove track structure and an identification region such as a header region and data region irrespective of its use.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A track discriminating apparatus for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the apparatus comprising:

a servo error generating section for obtaining a difference signal of optical reflection signals in a track direction of the optical recording medium;

a differentiation section for differentiating the difference signal;

a slicing section for slicing the differentiated difference signal by predetermined upper and lower reference slice levels; and a signal generating section for discriminating a kind of the track using a result of slicing and generating a land/groove discrimination signal according to a result of discrimination, wherein the slicing section comprises:

a high slicing section for outputting an Lpulse signal of a high state if the differentiated difference signal is higher than a predetermined first reference level; and a low slicing section for outputting a Gpulse signal of a high state if the differentiated difference signal is lower than a predetermined second reference level, and wherein the signal generating section comprises:

a first flip-flop using the Lpulse signal as its clock signal;

a second flip-flop using the Gpulse signal as its clock signal; and a logic section for generating the land/groove discrimination signal representing whether the track is the land track or the groove track by exclusive-OR-gating output signals of the first and second flip-flops;

wherein an inverted output of the first flip-flop is inputted to a data terminal of the second flip-flop, and an output of the second flip-flop is inputted to a data terminal of the first flip-flop.

2. The apparatus as claimed in claim 1, wherein the signal generating section discriminates the land track if a high level signal is outputted from the high slicing section, and discriminates the groove track if a high level signal is outputted from the low slicing section.

3. The apparatus as claimed in claim 1, wherein the signal generating section comprises a servo section for performing a servo by a servo error signal offset-adjusted to match the land track if the discriminated track is the land track, while performing a servo by a servo error signal offset-adjusted to match the groove track if the discriminated track is the groove track.

4. A track discriminating method for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the method comprising the steps of:

detecting a phase of a wobbling signal formed on respective land/groove tracks; and discriminating a kind of the present track by checking whether the phase of the wobbling signal is inverted using a reference signal and outputting a land/groove discrimination signal according to a result of discrimination, wherein the discriminating step comprises the steps of:

exclusive-OR-gating the wobbling signal sliced by the center level and the fedback land/groove discrimination signal;

generating a reference signal by applying a phase locked loop (PLL) to the exclusive-OR-gated wobbling signal; and comparing whether the phase of the sliced wobbling signal is equal or opposite to the phase of the reference signal, and discriminating whether the present track is the land track or the groove track according to a result of comparison.

5. The method as claimed in claim 4, wherein the phase detecting step detects the phase of the wobbling signal by slicing the wobbling signal formed on the respective land/groove tracks by a center level.

6. A track discriminating apparatus for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the apparatus comprising:

a first comparator for detecting a wobbling signal formed on respective land/groove tracks of the optical recording medium and slicing the wobbling signal by a first slice level;

a reference signal generating section for generating a reference signal by exclusive-OR-gating an output signal of the first comparator and a fedback land/groove discrimination signal and applying a phase locked loop (PLL) to an exclusive-OR-gated signal; and a signal generating section for discriminating a kind of the present track by checking whether the phase of the sliced wobbling signal is inverted using the reference signal, and generating the land/groove discrimination signal according to a result of discrimination.

7. The apparatus as claimed in claim 6, wherein the first slice level is a center level of the wobbling signal.

8. The apparatus as claimed in claim 6, wherein the signal generating section comprises:

a second comparator for slicing the wobbling signal formed on the respective land/groove tracks by a second slice level; and a flip-flop for receiving an output signal of the second comparator through its clock terminal and the reference signal through its data terminal, and generating the land/groove discrimination signal by checking a phase level of the signal inputted to its data terminal at a rising point of the signal inputted to its clock terminal.

9. The apparatus as claimed in claim 8, wherein the second slice level is lower than the center level of the wobbling signal.

10. The apparatus as claimed in claim 6, wherein the signal generating section comprises a logic circuit for exclusive-OR-gating the reference signal and the sliced wobbling signal to output the land/groove discrimination signal.

11. A track discriminating method for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the method comprising the steps of:

detecting information existing in a plurality of regions recorded on the header regions of the optical recording medium with their phases different;

delaying at least one of detected signals for a predetermined time; and discriminating a kind of the track by comparing phase levels of the detected signals having passed the delay step.

12. The method as claimed in claim 11, wherein the delaying step low-pass-filters the detected signals by different bandwidths, respectively.

13. The method as claimed in claim 11, wherein the discriminating step determines one among the delayed detected signals as a reference signal, and discriminates the kind of the track by checking phase levels of other detected signals at a rising point of the reference signal.

14. A track discriminating apparatus for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the apparatus comprising:

a detecting section for detecting information existing in a plurality of regions recorded on the header regions of the optical recording medium with their phases different;

a delay section for delaying at least one of detected signals for a predetermined time; and a signal generating section for discriminating a kind of the track by comparing phase levels of the detected signals having passed the delay step.

15. The apparatus as claimed in claim 14, wherein the delay section comprises a low pass filter for low-pass-filtering the respective detected signals by different bandwidths.

16. The apparatus as claimed in claim 14, wherein the signal generating section comprises a logic element for receiving any one of the delayed detected signals through its clock terminal and another one of the delayed detected signals through its data terminal, and outputting the land/groove discrimination signal by checking the phase level of the other delayed detected signal inputted to its data terminal at a rising point of the detected signal inputted to its clock terminal.

17. The apparatus as claimed in claim 16, wherein a delay amount of the detected signal inputted to the data terminal of the logic element is larger than a delay amount of the detected signal inputted to the clock terminal of the logic element.

18. A track discriminating method for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the method comprising:

a first discriminating step of discriminating a kind of the track by obtaining a difference signal of optical reflection signals in a track direction of the optical recording medium, differentiating the difference signal, and slicing the differentiated difference signal by upper and lower reference levels;

a second discriminating step of discriminating the kind of the track by detecting a phase of a wobbling signal formed on respective land/groove tracks and checking whether the phase of the wobbling signal is inverted using a reference signal;

a third discriminating step of discriminating the kind of the track by detecting information existing in a plurality of regions recorded on the header regions of the optical recording medium with their phases different, delaying at least one of the detected signals for a predetermined time, and comparing phase levels of the detected two signals; and a step of generating a land/groove discrimination signal by selecting or combining at least one of discriminated results at the first to third steps.

19. The method as claimed in claim 18, the reference signal at the second discriminating step is generated by slicing the wobbling signal by a center level of the wobbling signal, exclusive-OR-gating the sliced wobbling signal and the fedback land/groove discrimination signal, and applying a phase locked loop (PLL) to the exclusive-OR-gated wobbling signal.

20. A track discriminating apparatus for an optical recording medium having a land and groove track structure where neighboring signal tracks have depths different from each other in an incident direction of an optical beam, each signal track having a plurality of header regions which have different phases and which are repeatedly and alternately arranged for a predetermined section of the respective track, the apparatus comprising:

a first discriminating section for discriminating a kind of the track by obtaining a difference signal of optical reflection signals in a track direction of the optical recording medium, differentiating the difference signal, and slicing the differentiated difference signal by upper and lower reference levels;

a second discriminating section for discriminating the kind of the track by detecting a phase of a wobbling signal formed on respective land/groove tracks and checking whether the phase of the wobbling signal is inverted using a reference signal;

a third discriminating section for discriminating the kind of the track by detecting information existing in a plurality of regions recorded on the header regions of the optical recording medium with their phases different, delaying at least one of the detected signals for a predetermined time, and comparing phase levels of the detected two signals; and a signal generating section for generating a land/groove discrimination signal by selecting or combining at least one of discriminated results at the first to third steps.

* * * * *